US006405281B1

(12) United States Patent
Akerib

(10) Patent No.: US 6,405,281 B1
(45) Date of Patent: Jun. 11, 2002

(54) INPUT/OUTPUT METHODS FOR ASSOCIATIVE PROCESSOR

(75) Inventor: Avidan Akerib, Holon (IL)

(73) Assignee: Neomagic Israel Ltd, Netanya (IL)

(*) Notice: Subject to any disclaimer, the term of this patent is extended or adjusted under 35 U.S.C. 154(b) by 0 days.

(21) Appl. No.: 09/572,583

(22) Filed: May 17, 2000

Related U.S. Application Data

(60) Continuation-in-part of application No. 09/140,411, filed on Aug. 26, 1998, now Pat. No. 6,195,738, which is a continuation-in-part of application No. 09/052,164, filed on Mar. 31, 1998, now Pat. No. 5,974,521, which is a division of application No. 08/353,612, filed on Dec. 9, 1994, now Pat. No. 5,809,322.

(51) Int. Cl.[7] .............................................. G06F 12/00
(52) U.S. Cl. ....................................................... 711/108
(58) Field of Search ................................. 711/108, 109, 711/165, 169; 345/537, 538, 547, 548, 563; 365/49; 712/14

(56) References Cited

U.S. PATENT DOCUMENTS

| 3,848,234 A | * | 11/1974 | MacDonald | ................ 711/109 |
| 5,251,303 A | * | 10/1993 | Fogg et al. | .................... 710/24 |
| 5,475,825 A | * | 12/1995 | Yonezawa et al. | ............. 365/49 |
| 5,854,760 A | * | 12/1998 | Ikenaga et al. | ........ 365/230.01 |

OTHER PUBLICATIONS

Thurber, Kenneth J. and Wald, Leon D., "Associative and Parallel Processors", Computing Surveys vol. 7, No. 4, pp. 234–238.*

* cited by examiner

Primary Examiner—Matthew Kim
Assistant Examiner—Aseet Patel
(74) Attorney, Agent, or Firm—Mark M. Friedman

(57) ABSTRACT

A data processing device includes an associative processor that in turn includes one or more arrays of content addressable memory (CAM) cells and two or more tags registers. The device also includes a memory for storing the data and a bus for exchanging the data with the associative processor. During input and output operations, data are exchanged in parallel, via one of the tags registers. Another tags register is used to select rows of CAM cells for input or output. By appropriately shifting the bits in the buffer tags register between write or compare operation cycles, entire words are exchanged between the selected CAM cell rows and the buffer tags register. During arithmetical operations, in an embodiment with multiple CAM cell arrays, different tags registers are associated with different CAM cell arrays at will. If, in the course of performing arithmetical operations using one of the CAM cell arrays, so many columns of intermediate data are produced that insufficient columns remain for subsequent arithmetical operations, the columns of intermediate data are written to the memory, via the buffer tags registers. These columns of intermediate data are retrieved subsequently from the memory as needed, also via the buffer tags register.

1 Claim, 21 Drawing Sheets

| $W_{j+7,k-1}$ | $W_{j+7,k}$ | $W_{j+7,k+1}$ |
| --- | --- | --- |
| $W_{j+6,k-1}$ | $W_{j+6,k}$ | $W_{j+6,k+1}$ |
| $W_{j+5,k-1}$ | $W_{j+5,k}$ | $W_{j+5,k+1}$ |
| $W_{j+4,k-1}$ | $W_{j+4,k}$ | $W_{j+4,k+1}$ |
| $W_{j+3,k-1}$ | $W_{j+3,k}$ | $W_{j+3,k+1}$ |
| $W_{j+2,k-1}$ | $W_{j+2,k}$ | $W_{j+2,k+1}$ |
| $W_{j+1,k-1}$ | $W_{j+1,k}$ | $W_{j+1,k+1}$ |
| $W_{j,k-1}$ | $W_{j,k}$ | $W_{j,k+1}$ |

| | $116_{(j+7,k-1)}$ | $116_{(j,k)}$ | $116_{(j+1,k)}$ | $116_{(j+2,k)}$ | $116_{(j+3,k)}$ | $116_{(j+4,k)}$ | $116_{(j+5,k)}$ | $116_{(j+6,k)}$ | $116_{(j+7,k)}$ | $116_{(j,k+1)}$ | |
|---|---|---|---|---|---|---|---|---|---|---|---|
| $118_i$ | $\cdots$ | $b_i^{j,k}$ | $b_i^{j+1,k}$ | $b_i^{j+2,k}$ | $b_i^{j+3,k}$ | $b_i^{j+4,k}$ | $b_i^{j+5,k}$ | $b_i^{j+6,k}$ | | $b_i^{j,k+1}$ | $\cdots$ |
| $118_{ii}$ | $\cdots$ | $b_{ii}^{j,k}$ | $b_{ii}^{j+1,k}$ | $b_{ii}^{j+2,k}$ | $b_{ii}^{j+3,k}$ | $b_{ii}^{j+4,k}$ | $b_{ii}^{j+5,k}$ | $b_{ii}^{j+6,k}$ | | $b_{ii}^{j,k+1}$ | $\cdots$ |
| $118_{iii}$ | $\cdots$ | $b_{iii}^{j,k}$ | $b_{iii}^{j+1,k}$ | $b_{iii}^{j+2,k}$ | $b_{iii}^{j+3,k}$ | $b_{iii}^{j+4,k}$ | $b_{iii}^{j+5,k}$ | $b_{iii}^{j+6,k}$ | | $b_{iii}^{j,k+1}$ | $\cdots$ |
| $118_{iv}$ | $\cdots$ | $b_{iv}^{j,k}$ | $b_{iv}^{j+1,k}$ | $b_{iv}^{j+2,k}$ | $b_{iv}^{j+3,k}$ | $b_{iv}^{j+4,k}$ | $b_{iv}^{j+5,k}$ | $b_{iv}^{j+6,k}$ | | $b_{iv}^{j,k+1}$ | $\cdots$ |
| $118_v$ | $\cdots$ | $b_v^{j,k}$ | $b_v^{j+1,k}$ | $b_v^{j+2,k}$ | $b_v^{j+3,k}$ | $b_v^{j+4,k}$ | $b_v^{j+5,k}$ | $b_v^{j+6,k}$ | | $b_v^{j,k+1}$ | $\cdots$ |
| $118_{vi}$ | $\cdots$ | $b_{vi}^{j,k}$ | $b_{vi}^{j+1,k}$ | $b_{vi}^{j+2,k}$ | $b_{vi}^{j+3,k}$ | $b_{vi}^{j+4,k}$ | $b_{vi}^{j+5,k}$ | $b_{vi}^{j+6,k}$ | | $b_{vi}^{j,k+1}$ | $\cdots$ |
| $118_{vii}$ | $\cdots$ | $b_{vii}^{j,k}$ | $b_{vii}^{j+1,k}$ | $b_{vii}^{j+2,k}$ | $b_{vii}^{j+3,k}$ | $b_{vii}^{j+4,k}$ | $b_{vii}^{j+5,k}$ | $b_{vii}^{j+6,k}$ | | $b_{vii}^{j,k+1}$ | $\cdots$ |
| $118_{viii}$ | $\cdots$ | $b_{viii}^{j,k}$ | $b_{viii}^{j+1,k}$ | $b_{viii}^{j+2,k}$ | $b_{viii}^{j+3,k}$ | $b_{viii}^{j+4,k}$ | $b_{viii}^{j+5,k}$ | $b_{viii}^{j+6,k}$ | | $b_{viii}^{j,k+1}$ | $\cdots$ |

INPUT/OUTPUT METHODS FOR ASSOCIATIVE PROCESSOR

This is a continuation-in-part of U.S. patent application Ser. No. 09/140,411, filed Aug. 26, 1998, now U.S. Pat. No. 6,195,738, issued Feb. 27, 2001, which is a continuation-in-part of U.S. patent application Ser. No. 09/052,164, filed Mar. 31, 1998, now U.S. Pat. No. 5,974,521, issued Oct. 26, 1999, which is a divisional application of U.S. patent application Ser. No. 08/353,612, filed Dec. 9, 1994, now U.S. Pat. No. 5,809,322, issued Sep. 15, 1998.

FIELD AND BACKGROUND OF THE INVENTION

The present invention relates to associative processors and, more particularly, to an associative processor configured to perform two or more different arithmetical operations simultaneously and methods for loading the associative processor with data to be processed and for downloading the data after processing.

An associative processor is a device for parallel processing of a large volume of data. FIG. 1 is a schematic illustration of a prior art associative processor 10. The heart of associative processor 10 is an array 12 of content addressable memory (CAM) cells 14 arranged in rows 16 and columns 18. Associative processor 10 also includes three registers for controlling CAM cells 14: a tags register 20 that includes many tag register cells 22, a mask register 24 that includes many mask register cells 26, and a pattern register 28 that includes many pattern register cells 30. Each cell 14, 22, 26 or 30 is capable of storing one bit (0 or 1). Tags register 20 is a part of a tags logic block 36 that communicates with each row 16 via a dedicated word enable line 32 and a dedicated match result line 34, with each tag register cell 22 being associated with one row 16 via word enable line 32, match result line 34 and a dedicated logic circuit 38. Each mask register cell 26 and each pattern register cell 30 is associated with one column 18. For illustrational simplicity, only three rows 16, only one word enable line 32, only one match result line 34 and only one logic circuit 38 are shown in FIG. 1. Typical arrays 12 include 8192 ($2^{13}$) rows 16. The array 12 illustrated in FIG. 1 includes 32 columns 18. More typically, array 12 includes 96 or more columns 18.

Each CAM cell 14 can perform two kinds of elementary operations, as directed by the contents of the corresponding cells 22, 26 or 30 of registers 20, 24 and 28: compare operations and write operations. For both kinds of elementary operations, columns 18 that are to be active are designated by the presence of "1" bits in the associated mask register cells 26. The contents of tag register cells 22 are broadcast to the associated rows 16 as "write enable" signals by tags logic block 36 via word enable lines 32, with rows 16 that receive a "1" bit being activated. In a single cycle of compare operations, each activated row 16 generates a "1" bit match signal on match result line 34 of that row 16. Each activated CAM cell 14 of that row 16 compares its contents with the contents of the cell 30 of pattern register 28 that is associated with the column 18 of that CAM cell 14. If the two contents are identical (both "0" bits or both "1" bits), that CAM cell 14 allows the match signal to pass. Otherwise, that CAM cell 14 blocks the match signal. As a result, if the contents of all the activated CAM cells 14 of a row 16 match the contents of corresponding cells 30 of pattern register 28, the match signal reaches tags logic block 36 and the associated logic circuit 38 writes a "1" bit to the associated tag register cell 22; otherwise, the associated logic block 38 writes a "0" bit to the associated tag register cell 22. In a single cycle of write operations, the contents of pattern register cells 30 associated with activated columns 18 are written to the activated CAM cells 14 of those columns 18.

In the example illustrated in FIG. 1, the fifth through eighth columns 18 from the right are activated by the presence of "1"s in the corresponding mask register cells 26. A binary "4" (0100) is stored in the corresponding pattern register cells 30. A compare operation cycle by associative processor 10 in this configuration tests activated rows 16 to see if a binary "4" is stored in their fifth through eighth CAM cells 14 from the right. A write operation cycle by associative processor 10 in this configuration writes binary "4" to the fifth through eighth CAM cells 14 from the right of activated rows 16.

In summary, in both kinds of elementary operations, tags register 20 and mask register 24 provide activation signals and pattern register 28 provides reference bits. Then, in a compare operation cycle, array 12 provides input to compare with the reference bits and tags register 20 receives output; and in a write operation cycle, array receives output that is identical to one or more reference bits.

Tags logic block 36 also can broadcast "1"s to all rows 16, to activate all rows 16 regardless of the contents of tags register 20.

An additional function of tags register 20 is to provide communication between rows 16. The results of a compare operation executed on rows 16 are stored in tags register 20, wherein every bit corresponds to a particular row 16. By shifting tags register 20, the results of this compare operation are communicated from their source rows 16 to other, target rows 16. In a single tags shift operation the compare result of every source row 16 is communicated to a corresponding target row 16, the distance between any source row 16 and the corresponding target row 16 being the distance of the shift.

Any arithmetical operation can be implemented as successive write and compare cycles. For example, to add an integer N to all the m-bit integers in an array, after the integers have been stored in m adjacent columns 18 of array 12, with one integer per row 16, the following operations are performed:

For each integer M that can be represented by m bits (i.e., the integers 0 through $2^{m-1}$):
(a) write M to the cells 30 of pattern register 28 that correspond to the m adjacent columns 18;
(b) activate all rows 16 by broadcasting "1" to all rows 16;
(c) execute a cycle of simultaneous compare operations with the activated CAM cells 14 to set to "1" the contents of tag register cells 22 associated with rows 16 that store M and to set to "0" the contents of all other tag register cells 22;
(d) write M+N to the cells 30 of pattern register 28 that correspond to the m adjacent columns 18; and
(e) execute a cycle of simultaneous write operations with the activated CAM cells 14 to write M+N to the activated rows 16.

Associative processor 10 is well-suited to the parallel processing of data, such as digital image data, that consist of relatively short integers. For example, each pixel of an image with 256 gray levels is represented by an 8-bit integer. To add a number N to 8192 such integers in a serial processor requires 8192 add cycles. To add N to 8192 such integers in associative processor 10 requires 256 compare cycles and 256 write cycles.

More information about prior art associative processors may be found in U.S. Pat. No. 5,974,521, to Akerib, which is incorporated by reference for all purposes as if fully set forth herein.

Nevertheless, prior art associative processors such as associative processor 10 suffer from certain inefficiencies. First, rows 18 must be wide enough to accommodate all the operands of every arithmetical operation that is to be performed using the associative processor. Most arithmetical operations do not require the full width of array 12, so most of the time, many CAM cells 14 are idle. Second, although the arithmetical operations themselves are performed in parallel, the input to array 12 and the output from array 12 must be effected serially. For example, one way to store the input m-bit integers of the above example in the m adjacent columns 18 of array 12 is as follows:

(a) Select m adjacent columns 18 of array 12 to store the input integers.

Set the contents of the corresponding mask register cells 26 to "1" and the contents of all the other mask register cells 26 to "0".

(b) For each input integer, write the integer to the cells 30 of pattern register 28 that correspond to the selected columns 18, activate one row 16 of array 12 by setting the contents of the corresponding tag register cell 22 to "1" and the contents of all the other tag register cells to "0", and execute a cycle of simultaneous write operations with the activated CAM cells 14. Storing 8192 input integers in this manner requires 8192 write cycles, the same number of cycles as the 8192 fetch cycles that would be required by a serial processor.

Furthermore, if the data to be processed are stored in a dynamic random access memory (DRAM), then, in order to access the data stored in a row of the DRAM, a row precharge is required. This row precharge typically requires six to ten machine cycles. It would be highly advantageous to maximize the input at every row precharge. In the case of embedded DRAM, each row may store thousands of bits. It would be highly advantageous to be able to input many or all of these bits into an associative array processor in only a small number of machine cycles, especially in an application, such as real-time image processing, which requires very high data rates, typically upwards of 30 VGA frames per second.

The serial input/output issue has been addressed to a certain extent in U. S. patent application Ser. No. 09/140,411, which is incorporated by reference for all purposes as if fully set forth herein. According to this patent application, the memory, wherein the data to be processed are stored, is connected to tags register 20 by a bus with enough bandwidth to fill tags register 20 in one machine cycle. Enough data bits to fill tags register 20 are written from the memory to tags register 20 via the bus. A write operation cycle is used to write these bits to one of columns 18. This is repeated until as many columns 18 as required have received the desired input. This procedure is reversed, using compare operations instead of write operations, to write from array 12 to the memory.

Although the teachings of U.S. patent application Ser. No. 09/140,141 enable parallel input and output, column by column, "from the side", rather than word by word, "from the top", this parallel input and output leaves room for improvement. For example, according to the teachings of U.S. patent application Ser. No. 09/140,141, the bus that connects the memory to tags register 20 must have enough bandwidth to fill tags register 20 in one machine cycle. It is difficult to fabricate such a bus for a typical tags register 20 that includes 8192 tag register cells 22, as such a bus would have to have sufficient bandwidth to transfer 8192 bits at once. In addition, although such a bus would be used for only a small fraction of the overall processing time, such a bus would generate power consumption peaks when used. It would be advantageous to reduce the magnitude of the power consumption peaks while maintaining sufficient bandwidth to transfer the bits of tags register 20 to the memory in only a small number of machine cycles. Furthermore, the data bits that are written to tags register 20 usually constitute discrete words. A write operation cycle writes these words, concatenated one to the other, to a column 18, when what is really desired is to do what the serial input method accomplishes, i.e., to write each word to a different row 16.

There is thus a widely recognized need for, and it would be highly advantageous to have, an associative processor that uses its CAM cells more intensively than known associative processors and that supports parallel input and output in a manner superior to that known in the art.

SUMMARY OF THE INVENTION

According to the present invention there is provided a method of transferring at least one data word from a memory to an array of content addressable memory (CAM) cells, each at least one data word including a like plurality of bits, the array including as many rows of the CAM cells as there are bits in all of the at least one data word and as many columns of the CAM cells as there are bits in each data word, the method including the steps of: (a) associating a first tags register with the array, the first tags register including a plurality of tag register cells; (b) writing the at least one data word from the memory to the first tags register; (c) for each of the at least one data word, selecting a corresponding row of CAM cells whereto transfer the each data word; and (d) for each of at least some columns of the array, executing a write operation on each CAM cell of the each column that occupies one of the at least one selected row, with reference to the first tags register, to write, to each of the CAM cells of the each column that occupies one of the at least one selected row, a respective bit of the corresponding data word.

According to the present invention there is provided a method of transferring, to a memory, from each of at least one row of an array of content addressable memory (CAM) cells, a data word that is stored therein, each data word including a like plurality of bits, so that the at least one row spans as many columns of the array as there are bits in each data word, there also being as many rows in the array as there are bits in all of the at least one data word, the method including the steps of: (a) associating a first tags register with the array, the first tags register including a plurality of tag register cells; (b) selecting the at least one row of CAM cells wherein the at least one data word is stored; (c) for each column of the array: (i) executing a compare operation on each CAM cell of the each column, to write, to the first tags register, from each of the CAM cells of the each column that occupies one of the selected rows, a respective bit of the data word stored therein, and (ii) shifting collectively the bits of the at least one data word, that have been thus written to the first tags register, so that after the executing has been effected for all the columns of the array, the at least one data word is written to the first tags register; and (d) writing the at least one data word from the first tags register to the memory.

According to the present invention there is provided a method of processing input data, including the steps of: (a)

providing a device for processing the data, the device including: (i) a memory, (ii) an associative processor including an array of content addressable memory (CAM) cells, and (iii) a buffer; (b) storing the input data in the array; (c) executing a first operation on the input data in the array, thereby storing intermediate data in the array; (d) writing the intermediate data from the array to the buffer; and (e) writing the intermediate data from the buffer to the memory.

According to the present invention there is provided a method of processing a plurality of bits stored in a memory, including the steps of: (a) providing an associative processor including: (i) a first array of content addressable memory (CAM) cells, the first array including a plurality of rows of the CAM cells and at least one column of the CAM cells; (ii) a second array of the CAM cells that includes at least one column of the CAM cells and a plurality of rows of the CAM cells equal in number to the rows of the first array; and (iii) at least one tags register having a plurality of tag register cells equal in number to the rows of the first array; (c) writing a first at least one bit from the memory to a respective cell of the tags register; (d) writing the first at least one bit from the tags register to one of the at least one column of the first array; (e) writing a second at least one bit from the memory to a respective cell of the tags register; and (f) writing the second at least one bit from the tags register to one of the at least one column of the second array.

According to the present invention there is provided a device for processing data, including: (a) a memory for storing the data; (b) an associative processor, for processing the data, the associative processor including: (i) a plurality of rows and columns of content addressable memory (CAM) cells, and (ii) a tags register including a plurality of tag register cells equal in number to the rows of the CAM cells, each tag register cell being operationally associated with a respective the row; (c) a bus for exchanging the data between the memory and the tags register, a plurality of bits of the data that are fewer in number than the rows of CAM cells being so exchanged together; and (d) a mechanism for selecting a subplurality of the tag register cells, equal in number to the plurality of bits, for storing the plurality of bits during the exchange According to the present invention there is provided a device for processing data, including: (a) a memory for storing the data; (b) an associative processor, for processing the data, the associative processor including: (i) a plurality of arrays of content addressable memory (CAM) cells, each array including a like plurality of rows of the CAM cells, (ii) at least one tags register, including a plurality of tag register cells equal in number to the rows of the each array; and (iii) a mechanism for reversibly associating each at least one tags register operationally with at least one of the arrays, each tags register cell of the each tags register being associated with a respective row of each at least one array; and (c) a bus for exchanging the data between the memory and one of the at least one tags register.

According to the present invention there is provided a method of processing input data, including the steps of: (a) providing a device for processing the input data, the device including: (i) a memory, and (ii) an array processor including: (A) a plurality of arrays of content addressable memory (CAM) cells, and (B) a tags register; (b) storing the input data in the memory; (c) writing a first portion of the input data from the memory to the tags register; (d) copying the first portion of the input data from the tags register to a first the array; (e) writing a second portion of the input data from the memory to the tags register; and (f) copying the second portion of the input data from the tags register to a second the array.

An associative processor of the present invention includes several arrays of CAM cells, as well as a tags logic block that includes several tags registers. Each row of each CAM cell array is connected to the tags logic block by its own word enable line and by its own match result line, so that the tags logic block can associate any of its tags registers with one or more of the CAM cell arrays. Furthermore, the tags logic block can change that association at any time. Specifically, the logic circuit, that is associated with corresponding rows of the several arrays, manages the signals on the word enable lines and the match result lines of these CAM cell arrays with reference to corresponding tag register cells in any one of the tags registers. For example, the tags logic block effects logical combinations (e.g., AND or OR) of match signals and prior contents of the cells of one tag registers, and stores the results either in place in the same tags register or in another tags register.

It is preferable that at least one of the tags registers be located between two of the CAM cell arrays. Either the entire tags logic block is located between two of the CAM cell arrays, or one or more but not all tags registers are located between two of the CAM cell arrays. In the latter case, the components of the tags logic block necessarily are not all contiguous.

The ability to "mix and match" CAM cell arrays and tags registers enhances the efficiency with which the CAM cells of the present invention are used. To this end, the CAM cell arrays of the present invention typically have fewer columns than prior art CAM cell arrays. In fact, it is preferred that the sum of the number of columns of the CAM cell arrays of the present invention be equal to the number of columns needed by a prior art CAM cell array to perform all the contemplated arithmetical operations. For example, in an embodiment of the associative processor of the present invention that includes two CAM cell arrays, each with half as many columns as a prior art CAM cell array, two arithmetical operations that each require half the columns of the prior art CAM cell array are performed in parallel, with one of the arithmetical operations being performed with reference to one of the tags registers and another of the arithmetical operations being performed with reference to another of the tags registers. The two arithmetical operations may be either identical or different. To perform an arithmetical operation that requires the full width of a prior art CAM cell array, both CAM cell arrays of the present invention are associated with the same tags register, and the arithmetical operation is performed with reference to that tags register. Furthermore, arithmetical operations may be pipelined. To pipeline two sequential arithmetical operations, one CAM cell array is dedicated to the first operation and another CAM cell array is dedicated to the second operation. Compare operation cycles on the first CAM cell array are paired with write operation cycles on the second CAM cell array to transfer the output of the first operation from the first CAM cell array to the second CAM cell array for the second operation, with the same tags register being associated with the first CAM cell array for the compare operation cycles and with the second CAM cell array for the write operation cycles. In each elementary operation cycle pair, a column of the first CAM cell array, activated by appropriate bits in the corresponding mask and pattern registers, is copied to a column of the second CAM cell array, also activated by appropriate bits in the corresponding mask and pattern registers. Note that the mask and pattern registers are shared by all the CAM cell arrays.

Preferably, the tags logic block can configure two of the tags registers temporarily as a single long tags register. This capability is useful, for example, in processing two contiguous portions of a digital image, each portion being stored in a different CAM cell array. In particular, during the application of an operator, such as a smoother or a convolution, that requires input from both sides of the boundary between the two portions, each of the two tags registers is associated with one of the CAM cell arrays, and compare operations are performed on the CAM cell arrays, with output to their respective tags registers. Then the contents of the tags registers are shifted, with bits that leave one tags register being shifted to the other tags register. In this way, data from one of the two contiguous portions of the digital image are processed with reference to data from the other portion, despite the two portions being stored in different CAM cell arrays. In subsequent operations, data in the two contiguous portions may be processed separately, in the usual manner. Following a compare operation on one of the CAM cell arrays, the contents of the tags register associated with that CAM cell array are shifted only within that tags register, with bits that leave one end of the tags register being either discarded or cycled to the other end of the tags register, so that the data stored in that CAM cell array are processed independently of the data stored in the other CAM cell array.

The ability to "mix and match" CAM cell arrays and tags registers also facilitates another aspect of the present invention, the parallelization of input and output in a manner superior to that taught in U.S. patent application Ser. No. 09/140,411. For example, to process data stored in a memory simultaneously in two CAM cell arrays, as described above, one of the tags registers is designated as an input tags register. This input tags register is associated with one of the CAM cell arrays. Enough data bits to fill the input tags register are written from the memory to the input tags register, over the course of several machine cycles, using a bus with less bandwidth than is needed to fill the input tags register in one machine cycle. In each machine cycle, a control block selects the tag register cells of the input tags block that are to receive the data bits that are written from the memory to the input tags block during that machine cycle. After the tags register is filled, a write operation cycle is used to write these bits to a column of the target CAM cell array. This is repeated until as many columns of the CAM cell array as required have received the desired input. Then the input tags register is associated with a different CAM cell array. Another set of data bits is written from the memory to the input tags register, and a write operation cycle again is used to write these bits to a column of the second CAM cell array. This is repeated until as many columns of the second CAM cell array as required have received the desired input.

If the bits that are written from the memory to the input tags register constitute discrete words, it usually is required to write each word to a different row of the target CAM cell array. To accomplish this, a second tags register is associated with the target CAM cell array. To select the rows that are to receive the words, "1" bits are written to the cells of the second tags register that correspond to these rows, and "0" bits are written to all other bits. A write operation cycle with reference to both tags registers writes one bit of each word to a target column. Then the bits in the input tags register are shifted together by one tag register cell and another write operation cycle with reference to both tags registers writes another bit of each word to another target column. This is repeated until all the bits in the input tags register have been written to the target rows.

Similarly, to write a set of words from source rows of a CAM cell array to a memory, two tags registers are associated with the CAM cell array. One of the tags registers is designated as an output tags register that is to receive the words that are to be written to the memory. To select the source rows of the CAM cell array, "1" bits are written to the cells of the other tags register that correspond to these rows, and "0" bits are written to all other bits. A compare operation cycle with reference to both tags registers writes one bit of each word from one column of the CAM cell array to the first tags register. Then the bits in the output tags register are shifted by one tag register cell and another compare operation cycle with reference to both tags registers writes another bit of each word from another column of the CAM cell array to the output tags register. This is repeated until all the bits of the words have been written to the output tags register. Finally, the words are written to the memory via the bus.

A data processing device of the present invention includes, in addition to the associative processor, a memory, preferably a random access memory, for storing data to be processed and a bus for exchanging data between the memory and the associative processor. The associative processor includes an input/output buffer, for storing data that is exchanged between the associative processor and the memory via the bus. This buffer includes as many buffer cells as there are rows in each array of CAM cells. As noted above, the bus exchanges fewer bits at one time between the memory and the buffer than there are buffer cells in the buffer. A control block is provided to direct bits, that are transferred together from the memory to the associative processor, to the correct subset of the buffer cells, and to designate the correct subset of the buffer cells from which to transfer bits collectively to the memory. In one preferred embodiment of the data processing device of the present invention, one of the tags registers is used as the input/output buffer, as in U.S. patent application Ser. No. 09/140,411. In another preferred embodiment of the data processing device of the present invention, the input/output buffer is one of the columns of CAM cells.

As many bits as there are rows of CAM cells in the associative processor are exchanged between the buffer and a target column of the associative processor in one elementary operation (compare or write) cycle. This is much faster than the one data element per elementary operation cycle of the prior art serial input/output method. This enhanced speed enables yet another aspect of the present invention. Because the rows of the CAM cell arrays of the present invention typically are shorter than the rows of prior art CAM cell arrays, an arithmetical operation executed on one of the CAM cell arrays may produce columns of intermediate results that leave insufficient room in the CAM cell array for the execution of subsequent arithmetical operations. These columns of intermediate results are written to the random access memory, via the input/output buffer, for temporary off-line storage, with one column of intermediate results being written in one machine cycle. As described above in the context of the parallelization of input and output, the number of machine cycles needed to transfer a column of intermediate results from the input/output buffer to the random access memory, or vice versa, depends on the bandwidth of the bus that connects the input/output buffer to the random access memory. When these columns of intermediate results are again needed, they are retrieved from the random access memory, also via the input/output buffer.

BRIEF DESCRIPTION OF THE DRAWINGS

The invention is herein described, by way of example only, with reference to the accompanying drawings, wherein:

FIG. 7A–7D illustrate parallel input of data words from the I/O tags register of the device of FIG. 3 to CAM cell rows of the associative processor of FIG. 2;

FIG. 8A–8I illustrate the parallel input of eight rows of eight-bit pixels of a VGA image to eight CAM cell columns of the associative processor of FIG. 2;

DESCRIPTION OF THE PREFERRED EMBODIMENTS

The present invention is of an associative processor that operates more efficiently than prior art associative processors, and of methods for its use. The present invention can be used for efficient processing of limited precision digital data such as eight-bit digital images.

The principles and operation of an associative processor according to the present invention may be better understood with reference to the drawings and the accompanying description.

Figure 2:
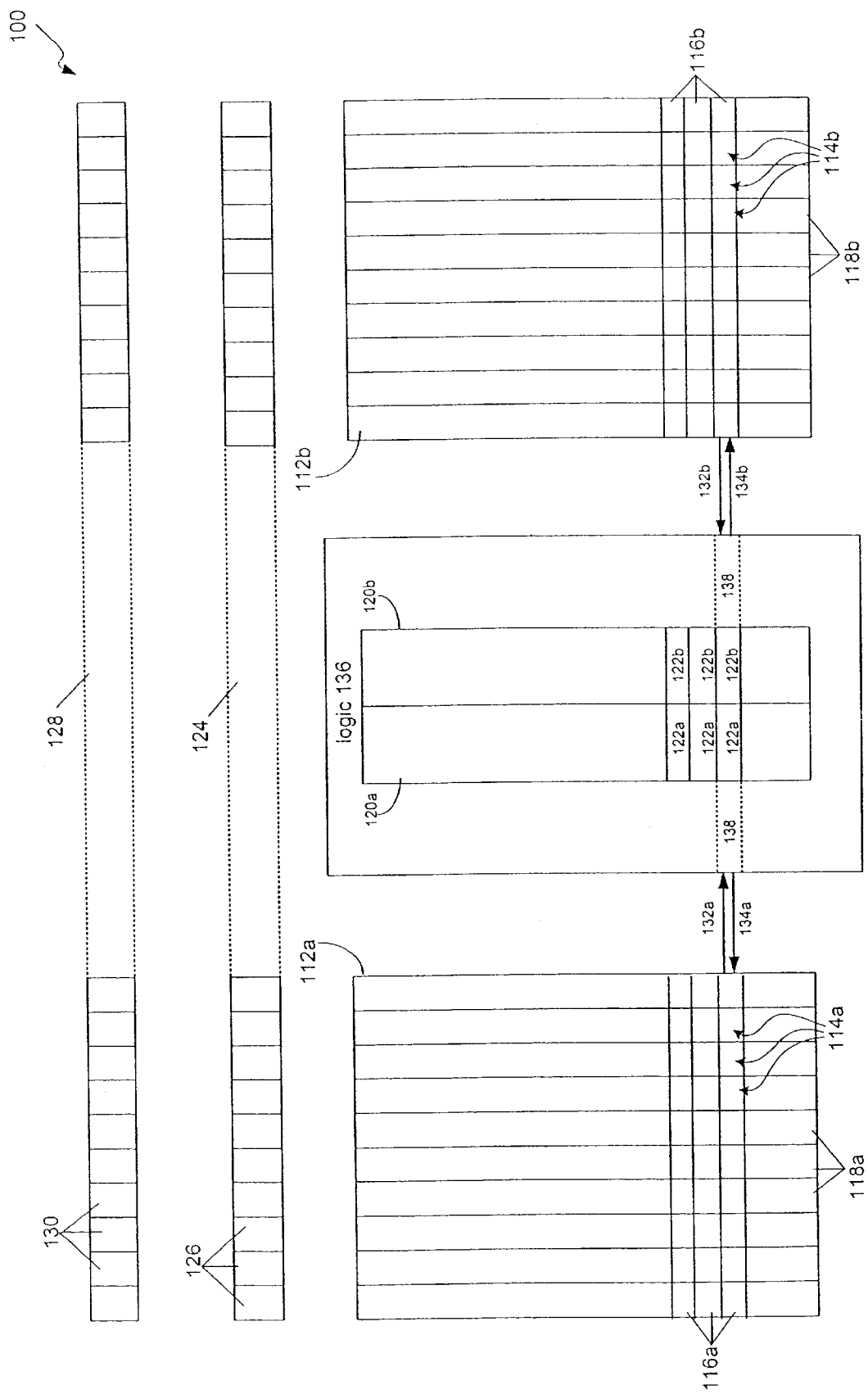
FIG. 2 is a schematic illustration of an associative processor of the present invention.

Referring now to the drawings, FIG. 2 is a schematic illustration of an associative processor 100 of the present invention. Similar to prior art associative processor 10, the heart of associative processor 100 is two arrays 112a and 112b of CAM cells 114a and 114b. In array 112a, CAM cells 114a are arranged in rows 116a and columns 118a. In array 112b, CAM cells 114b are arranged in rows 116b and 118b. Associative processor 100 also includes four registers for controlling CAM cells 114a and 114b: two tags registers 120a and 120b that include many tag register cells 122a and 122b, respectively, a mask register 124 that includes many mask register cells 126, and a pattern register 128 that includes many pattern register cells 130. Each cell 114a, 114b, 122a, 122b, 126 or 130 is capable of storing one bit (0 or 1). Tags registers 120a and 120b are part of a tags logic block 136 that communicates with each row 116a via a dedicated word enable line 132a and a dedicated match result line 134a, and with each row 116b via a dedicated word enable line 132b and a dedicated match result line 134b, with each tag register cell 122a and 122b being associated with one row 116a and one row 116b via word enable lines 132a and 132b, match result lines 134a and 134b, and a dedicated logic circuit 138. Each mask register cell 126 and each pattern register cell 130 is associated with one column 118a or 118b. For illustrational simplicity, only three rows 116a and 116b, only two word enable lines 132a and 132b, only two match result lines 134a and 134b, and only one logic circuit 138 are shown in FIG. 2. Note that both halves of this logic circuit are labeled with the reference numeral 138. As in the case of prior art associative processor 10, typical arrays 112 include 8192 rows 116, and the total number of columns 118 in an associative processor of the present invention typically is at least 96.

Figure 1:
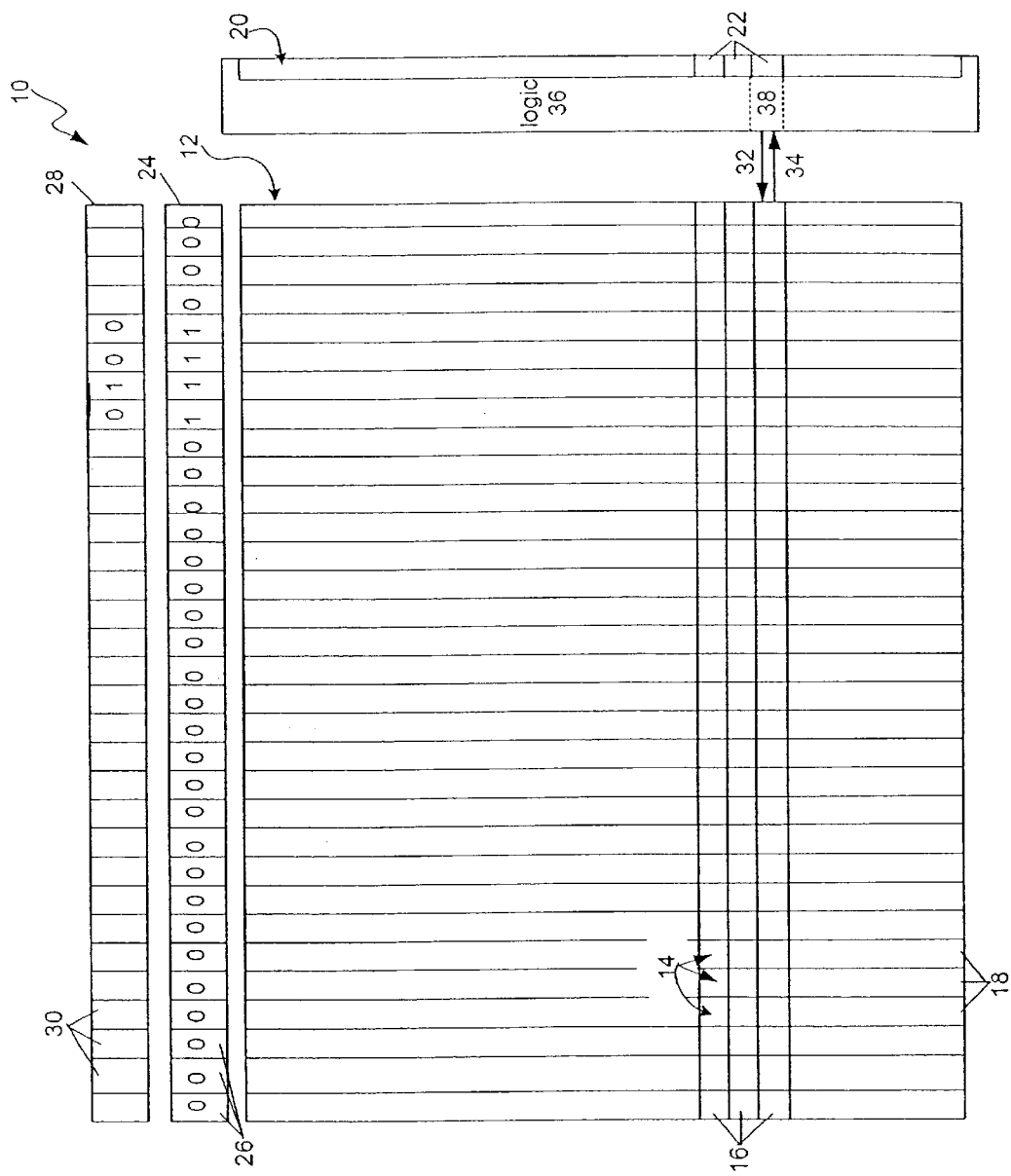
FIG. 1 is a schematic illustration of a prior art associative processor.

The placement of tags logic block 136 between arrays 112 in FIG. 1 is not merely conceptual. Preferably, tags logic block 136 is positioned physically between arrays 112. If tags logic block 136 were to be positioned, for example, to the right of both arrays 112, this would require tags logic block 136 to communicate with arrays 112 using one word enable line and one match result line that re twice as long as word enable lines 132 and match result lines 134. In an arithmetical operation that uses only array 112b, such a configuration would consume as much power as the illustrated configuration; but in an arithmetical operation that uses only array 112a, such a configuration would consume much more power than the illustrated configuration as the signals on the one long word enable line and on the one long match result line traverse array 112b.

The operation of associative processor 100 is similar to the operation of associative processor 10, with the exception that tags logic block 136 may associate either or both of tags registers 120 with either or both of arrays 112. Each CAM cell 14 can perform two kinds of elementary operations, as directed by the contents of the corresponding cells 122, 126 or 130 of registers 120, 124 and 128: compare operations and write operations. In both kinds of elementary operations, columns 118 that are to be active are designated by the presence of "1" bits in the associated mask register cells 126. The contents of tag register cells 122a, the contents of tag register cells 122b, or the results of logical operations (e.g., AND or OR operations) carried out on the contents of tag register cells 122a and 122b associated with one pair of rows 116a and 116b, are broadcast to the associated rows 116a and/or 116b by tags logic block 136 via word enable lines 132a and 132b, with rows 116 that receive a "1" bit being activated. In a compare operation cycle, each activated row 116 generates a "1" bit match signal on match result line 134 of that row 116. Each activated CAM cell 114 of that row 116 compares its contents with the contents of the cell 130 of pattern register 128 that is associated with the column 118 of that CAM cell 114. If the two contents are identical (both "0" bits or both "1" bits), that CAM cell 114 allows the match signal to pass. Otherwise, that CAM cell 114 blocks the match signal, As a result, if the contents of all the activated CAM cells 114 of a row 116 match the contents of corresponding cells 130 of pattern register 128, the match signal reaches tags logic block 136 and the associated logic circuit 138 writes a "1" bit to one or both of the associated tag register cells 122a and 122b; otherwise, the associated logic circuit 138 writes a "0" bit to one or both of the associated tag register cells 122a and 122b. In a write operation cycle, the contents of pattern register cells 130 associated with activated columns 118 are written to the activated CAM cells 114 of those columns 118.

Other ways of using tags registers 120 in conjunction with either or both arrays 112 will be readily apparent to those skilled in the art. In particular, logic circuits 138 may perform one or more logical operations on the data in one or more of the associated tag register cells 122 and the match signals from the associated match result lines 134, and then store the results of these logical operations in the associated tag register cells of one of tags registers 120. For example, logic circuits 138 may perform logical AND operations on match signals from match result lines 134a and the contents of the associated tag register cells 122a, and store the results in the associated tag register cells 122b. During the same machine cycle, logic circuits may perform logical OR operations on match signals from match result lines 134a and the contents of the associated tag register cells 122a, and then store the results in the same tag register cells 122a.

The simplest way to use associative processor 100 is just like prior art associative processor 10. One of tags registers 120 is associated with one or both of arrays 112. To execute arithmetical operations that require no more columns 118 than are present in one array 112, one of tags registers 120 is associated with one of arrays 112. To execute arithmetical operations that require more columns 118 than are present in one of arrays 112 but no more than the number of columns 118 present in both arrays 112, one of tags registers 120 is associated with both arrays 112, which then are used together as a combined array.

The advantages of associative processor 100 over associative processor 10 emerge in other modes of use of associative processor 100, for executing arithmetical operations that require no more columns than are present in one array 112. One such ode is parallel execution of such arithmetical operations. One tags register (for example, tags register 120a) is associated with one array 112 (for example, array 12a) and the other tags register (for example tags register 120b) is associated with he other array (for example, array 112b). The operands needed for the arithmetical operation are loaded into arrays 112a and 112b in parallel, and the arithmetical operation is executed on both sets of operands simultaneously.

Similarly, two different arithmetical operations may be executed simultaneously on two different sets of input data, one arithmetical operation being executed on input data stored in array 112a, with reference to tags register array 120a, and the other arithmetical operation being executed on input data stored in array 112b, with reference to tags register array 120b.

An associative processor of the present invention that is configured to operate in this "dual array" mode is almost twice as fast as a comparable prior art associative array processor, at the cost of an increased size, primarily due to the duplication of tags register arrays 120, and increased power consumption. We have found that the chip, on which a typical associative processor 100 fabricated, is about 30% larger than a comparable prior art chip. This associative processor 100 runs 80% faster than a comparable prior art associative processor 10 while consuming 70% more power.

Another such mode is pipelining, in which one array 112 is dedicated to one arithmetical operation while the other array 112 is dedicated to a subsequent arithmetical operation on the output of the first arithmetical operation. For this purpose, the results of the first arithmetical operation, residing in CAM cells 114 of the array 112 that is dedicated to the first arithmetical operation, are transferred to the array 112 that is dedicated to the second arithmetical operation via one of tags registers 120 by one or more cycles of compare operations on the array 112 that is dedicated to the first arithmetical operation and one or more cycles of write operations on the array 112 that is dedicated to the second arithmetical operation, as follows. Assume, for definiteness, that array 112a is dedicated to the first arithmetical operation, that array 112b is dedicated to the second arithmetical operation, and that tags register 120a is used to transfer the results of the first arithmetical operation from array 112a to array 112b. The first step is to zero out columns 118b that are to receive the operands of the second operation, by activating all rows 116b, masking all but the target columns 118b by loading "1" bits into the corresponding mask register cells 126 and "0" bits into all other mask register cells 126, loading "0" bits into the corresponding pattern register cells 130, and executing a write operation cycle on array 112b. Then, columns 118a that contain output bits of the first arithmetical operation are selected successively, using "1" bits in both the associated mask register cells 126 and the associated pattern register cells 130. For each such column 118a, a compare operation cycle copies the contents of this column 118a to tags register 120a. Then column 118b that is to receive these contents is activated by a "1" bit in the corresponding mask register cell 126 and pattern register cell 130, and CAM cells 114b that are to receive "1" bits are activated by tags register 120a via word enable line 132b. Finally, a write operation cycle on array 112b copies the "1" bit in the corresponding pattern register cell 130 to the target CAM cells 114b. This is repeated for each source column 118a and for each target column 118b.

Another aspect of the present invention is improved parallel input to and output from an associative processor.

Figure 3:
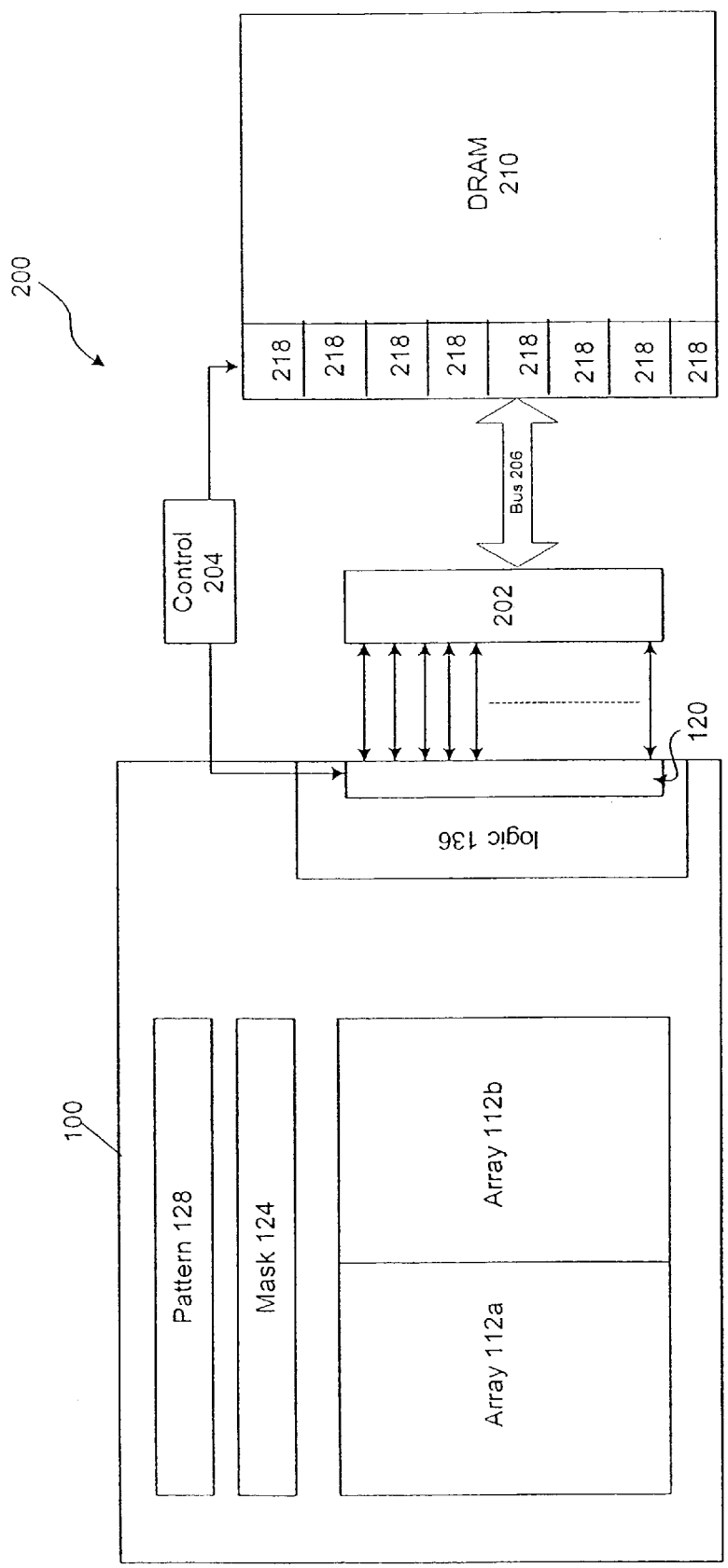
FIG. 3 is a high level block diagram of a data processing device based on the associative processor of FIG. 2.
Figure 4:
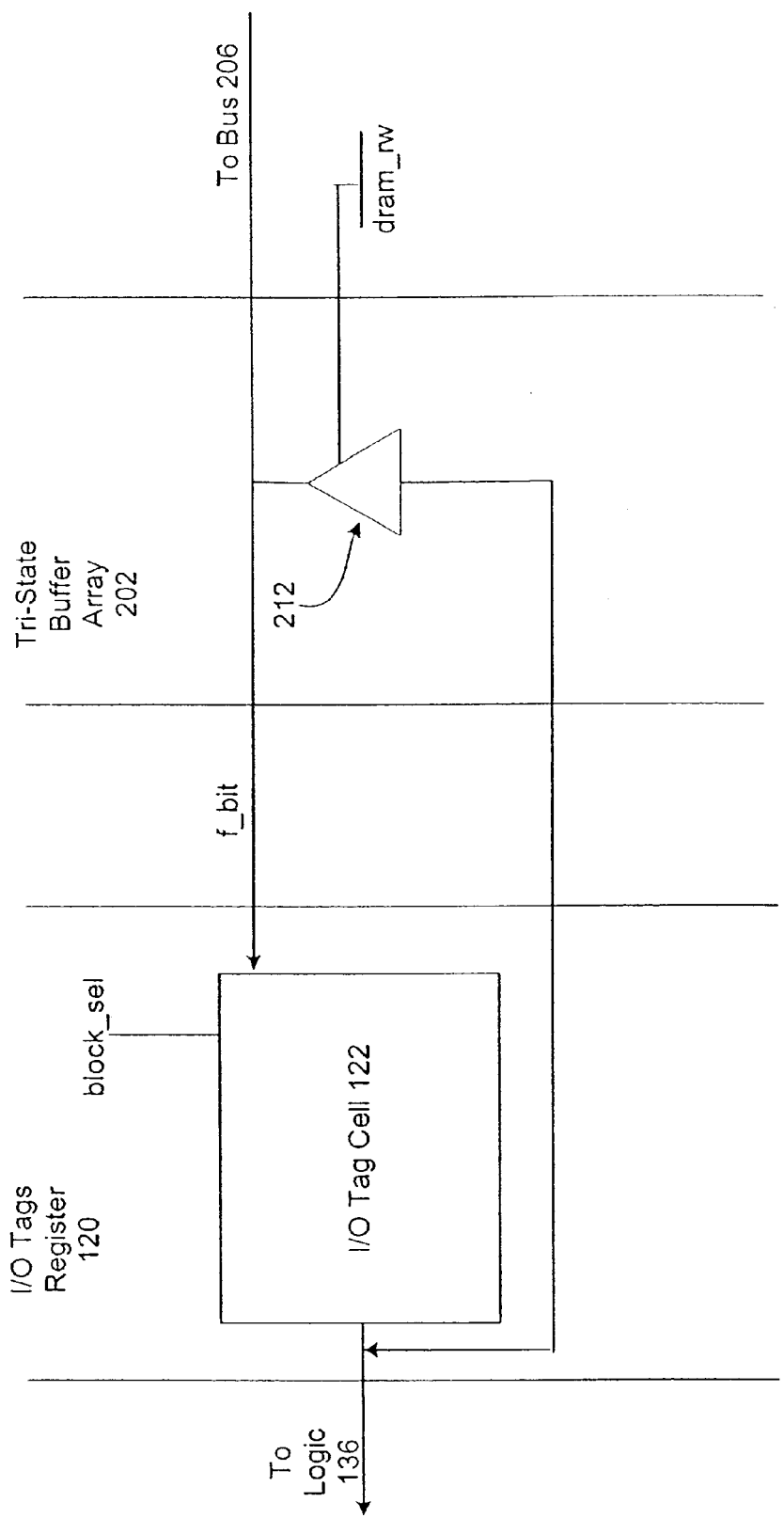
FIG. 4 shows an I/O tag register cell and a tri-state buffer of the device of FIG. 3.

FIG. 3 is a high level block diagram of a data processing device 200 configured to implement this aspect of the present invention. Device 200 is based on an associative processor 100 of the present invention and on a dynamic random access memory (DRAM) 210 for storing the data to be processed. In particular, associative processor 100 of FIG. 3 is a variant of associative processor 100 of FIG. 2 that includes 8192 rows 116 in arrays 112 and 8192 corresponding tag register cells 122 in each tags register 120. Note that only one tags register 120 is shown; this tags register 120 is used as an input/output (I/O) buffer. For this purpose, each tag register cell 122 of I/O tags register 120 is connected to a tri-state buffer 212, as illustrated in FIG. 4 and as symbolized in FIG. 3 by the double-headed arrows connecting the I/O tags register 120 and an array 202 of tri-state buffers 212. Array 202 of tri-state buffers 212 in turn communicates with a set of eight 1024-bit storage banks 218 in DRAM 210 via a 1024-bit bus 206 under the supervision of a control block 204. The 8192 tag register cells of I/O tags register 120 also are partitioned among eight groups of 1024 cells each.

In an input operation, 8192 bits from DRAM 210 first are read into storage banks 218. Control block 204 selects the order in which each of the eight blocks of 1024 bits each that make up these 8192 input bits are to be sent from storage banks 218 to associative processor 100 via bus 206. Control block 204 also selects the order in which the eight blocks of 1024 input bits each are to be received in the tag register cells of I/O tags register 120. Note that the order in which the blocks of input bits are stored in I/O tags register 120 need not be the order in which the blocks of input bits are sent from storage banks 218. After all 8192 input bits have been received into I/O tags register 120, these bits are written to their destination CAM cell column 118 by a write operation cycle.

Similarly, in an output operation, 8192 bits are loaded into I/O tags block 120 by a compare operation cycle. These bits then are transferred, 1024 at a time, to storage banks 218 via bus 206 in an order determined by control block 204.

FIG. 4 shows one I/O tag register cell 122 of I/O tags register 120 and the connections thereof to the respective tri-state buffer 212 of array 202. In an input operation, tri-state buffers 212 are disabled, and for each input block of 1024 bits, I/O tag register cells 122 that are to receive these bits are enabled by block_sel signals from control block 204, and the bits are sent to the enabled I/O tag register cells 122 via bus 206 as f_bit signals. In an output operation, tri-state-buffers 212 are enabled by dram_rw signals, and for each output block of 1024 bits, I/O tag register cells 122 wherein these bits are stored are enabled by block_sel signals from control block 204.

Figure 5:
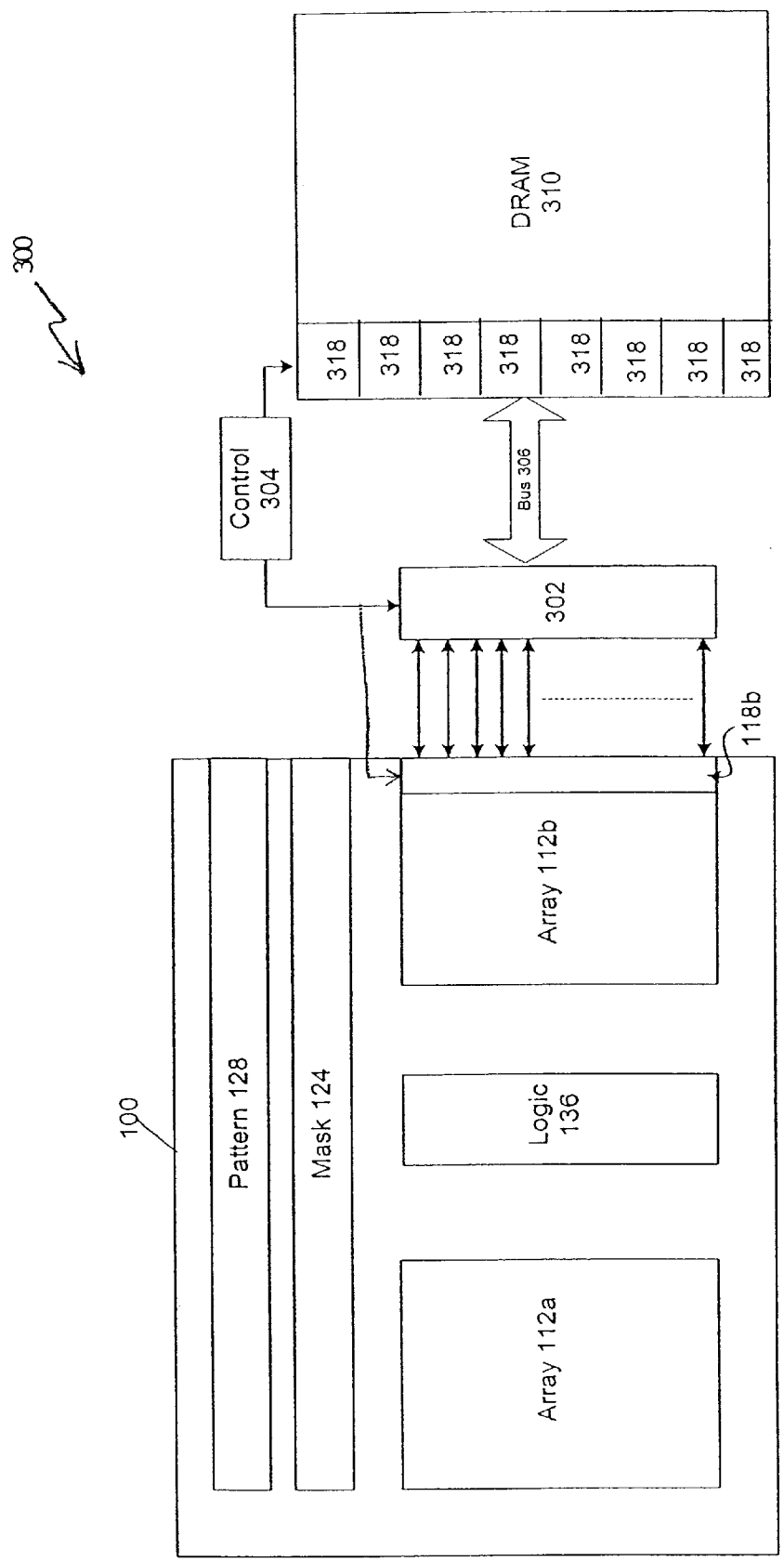
FIG. 5 is a high level block diagram of another data processing device based on the associative processor of FIG. 2.
Figure 6:
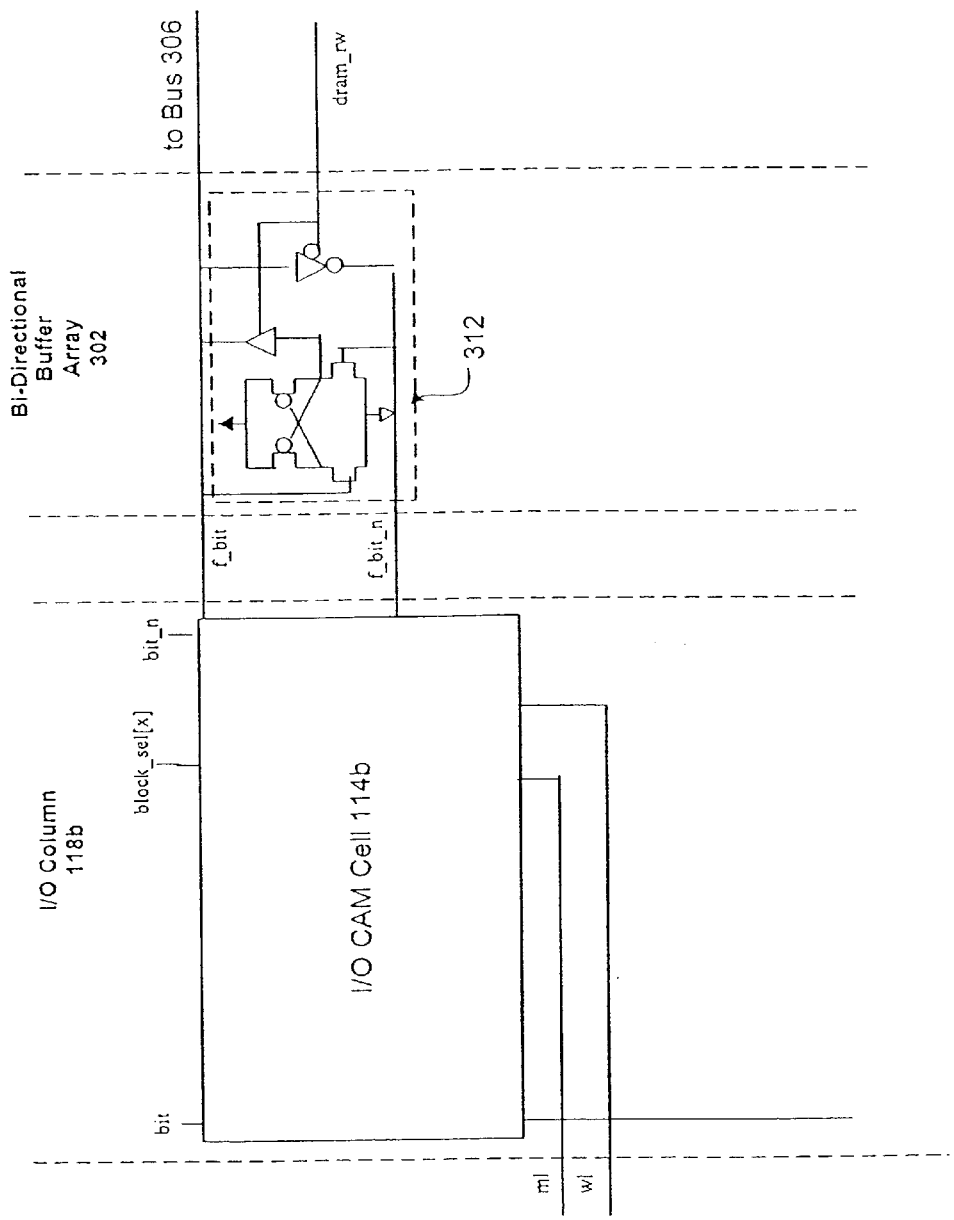
FIG. 6 shows an I/O CAM cell and a bi-directional buffer of the device of FIG. 5.

This parallel "sideways" input and output via bus 206 allows the parallel implementation of arithmetical operations, using CAM cell arrays 112a and 112b simultaneously on different input operands, that would otherwise require more columns than are present in either array 112a or array 112b separately to store intermediate results. Columns 118 of intermediate results are written to DRAM 210, thereby freeing up these columns 118 for other uses. The intermediate results are retrieved later from DRAM 210 as needed. In a data processing device based on prior art array processor 10, a similar exchange of intermediate results between array 12 and an external random access memory "from the top" would be unreasonably slow FIG. 5 is a high level block diagram of another data processing device 300 configured to implement parallel input and output. Device 300 is based on an associative processor 100 of the present invention that includes 8192 rows 116 in arrays 112 and 8192 corresponding tag register cells 122 in each tags register 120, and in which the rightmost column 118b of CAM cell array 112b is used as an input/output buffer for exchanging data with a DRAM 310. For this purpose, each CAM cell 114b of I/O column 118b is connected to a bi-directional buffer 312, as illustrated in FIG. 6 and as symbolized in FIG. 5 by the double headed arrows connecting I/O column 118b with an array 302 of bi-directional buffers 312. As in device 200, array 302 of bi-directional buffers 312 in turn communicates with a set of eight 1024-bit storage banks 318 in DRAM 310 via a 1024-bit bus 306 under the supervision of a control block 304. The 8192 CAM cells of I/O column 118b also are partitioned among eight groups of 1024 cells each.

The input and output operations of device 300 are similar to the input and output operations of device 200. In an input operation, 8192 bits from DRAM 310 first are read into storage banks 318. Control block 304 selects the order in which each of the eight blocks of 1024 bits each that make up these 8192 input bits are to be sent from storage banks 318 to associative processor 100 via bus 306. Control block 304 also selects the order in which the eight blocks of 1024 input bits each are to be received in the CAM cells of I/O column 118b. In an output operation, 8192 bits are loaded into I/O column 118b from one of the other columns 118 by a compare operation cycle. These bits then are transferred, 1024 at a time, to storage banks 318 via bus 306 in an order determined by control block 304.

FIG. 6 shows one I/O CAM cell 114b of I/O column 118b and the connections thereof to the respective bi-directional buffer 312 of array 302. In an input operation, the appropriate dram_rw signals from control block 304 put bi-directional buffers 312 into their "input" states, and for each input block of 1024 bits, I/O CAM cells 114b that are to receive these bits are enabled by block_sel signals from control block 304, and the bits are sent to the corresponding bi-directional buffers 312 via bus 306 and thence to the enabled I/O CAM cells 114b as f bit and f_bit_n signals. In an output operation, the appropriate dram_rw signals from control block 304 put bi-directional buffers 312 into their "output" states, and for each output block of 1024 bits, I/O CAM cells 114b wherein these bits are stored are enabled by block_sel signals from control block 304, and these bits are sent to the corresponding bi-directional buffers 312 as f bit and f_bit_n signals, and thence to the appropriate storage bank 318 via bus 306. The bit and bit_n lines in FIG. 6 lead to the mask register cell 126 and the pattern register cell 130 associated with I/O column 118b. "ml" and "wl" in FIG. 6 represent signals on a match result line 134 and on a word enable line 132, respectively.

In one typical image processing application of the present invention, it is desired to process a VGA image stored in DRAM 210. Each row of the VGA image includes 720 8-bit words, one word per image pixel, stored as 5760 contiguous bits. In such an image processing application, the words should be loaded, upon input, into respective rows of arrays 112 rather than all the bits of a word being loaded into the same column. FIG. 7 illustrates how this is accomplished. For the sake of illustrational clarity and conciseness, this aspect of the present invention is illustrated herein for words that are four bits long. It will be readily apparent to those skilled in the art how to apply the illustrated principles to realistic word lengths (e.g., 8 bits, 16 bits, 24 bits, 32 bits, or, in the case of CCD and CMOS sensor cameras, 10 bits or 12 bits per color component).

Specifically, FIG. 7 illustrates the loading of two four-bit words from I/O tags register 120, labeled 120i in FIG. 7, to columns 118i through 118iv in rows 116i and 116v, with the help of another tags register, labeled 120ii in FIG. 7. Tags register 120i holds the first word to be loaded, consisting of bits $b_i$ through $b_{iv}$, in tag register cells 122i through 122iv thereof, and the second word to be loaded, consisting of bits $b_v$ through $b_{viii}$, in tag register cells 122v through 122viii thereof. Tags logic block 136 loads tags register 120ii with a mask that has "1" bits in tag register cells 122i and 122v thereof that correspond to rows 116i and 116v that are to receive the input words and "0"s in tag register cells 122ii through 122iv thereof and 122vi through 122viii thereof.

Columns 118i through 118iv are initialized by activating these columns by loading "1" bits into the corresponding mask register cells 126i through 126iv and "0" bits into all other mask register cells 126, loading "0" bits into the corresponding pattern register cells 130i through 130iv, activating all rows 116 using tags logic block 136, and performing a write operation cycle to load "0" bits into all CAM cells 112 of columns 118i through 118iv. Then, pattern register cells 130i through 130iv are loaded with "1" bits.

Figure 7A:
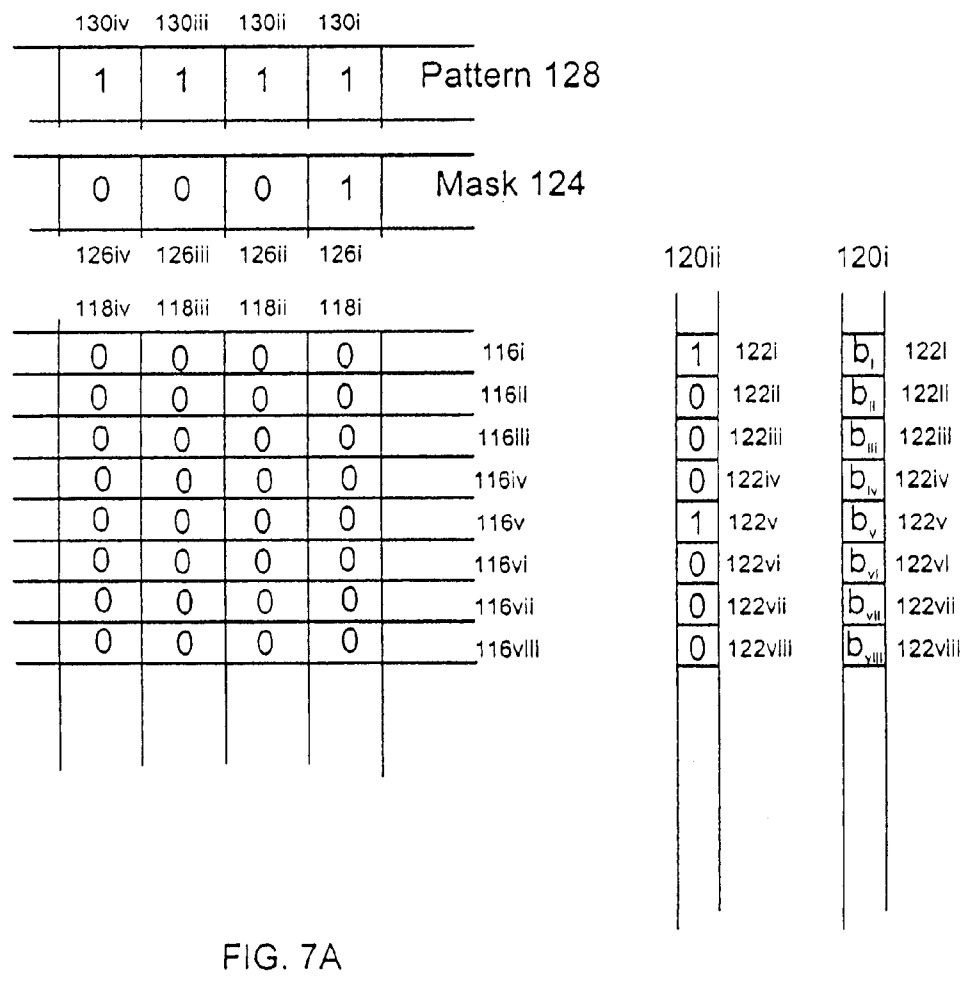

The first step in loading the input words into rows 116i and 116v is to activate column 118i by loading a "1" bit into mask register cell 126i and "0"s into all other mask register cells 126. The state of associative processor 100 after this step is shown in FIG. 7A. Then a write operation cycle is performed to copy bit $b_i$ to CAM cell 112 at column coordinate 118i and row coordinate 116i and to copy bit $b_v$ to CAM cell 112 at column coordinate 118i and row coordinate 116v. The write enable signals of this write operation cycle are formed by tags logic block 136 by ANDing the contents of tags registers 120i and 120ii. Thus, at most only the two target CAM cells 112 are enabled for writing. If bit $b_i$ is a "1" bit, then the "1" in pattern register cell 130i is copied to CAM cell 112 at column coordinate 118i and row coordinate 116i, and if bit $b_i$ is a "0" bit, the bit stored in this CAM cell 112 remains "0". Similarly, if bit $b_v$ is a "1" bit, then the "1" in pattern register cell 130i is copied to CAM cell 112 at column coordinate 118i and row coordinate 116v, and if bit $b_v$ is a "0" bit, the bit stored in this CAM cell 112 remains "0".

Figure 7B:
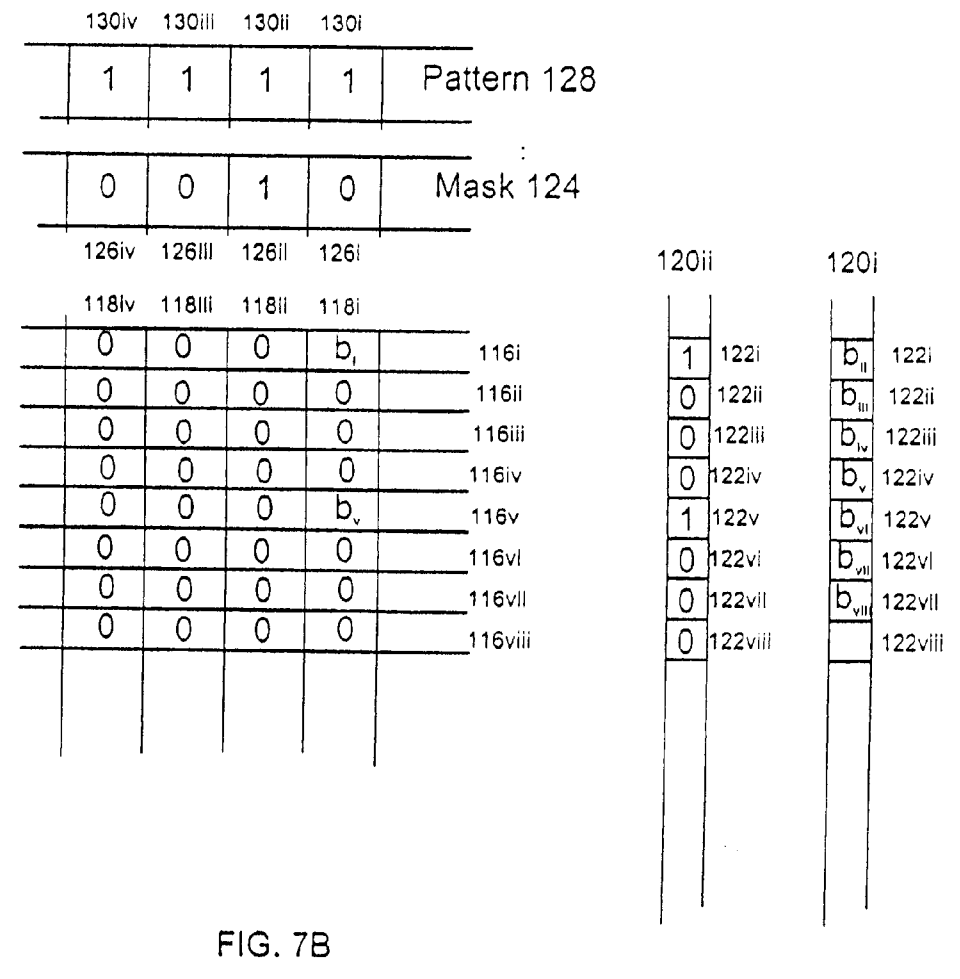

The next step in loading the input words into rows 116i and 116v is to activate column 118ii by loading a "1" bit into mask register cell 126ii and "0"s into all other mask register cells 126. Now, the input words are shifted collectively upwards in tags register 120i by one tag register cell 122 to put bit b$ii$ into tag register cell 122$i$ and bit b$_{vi}$ into tag register cell 122$iv$. FIG. 7B shows the state of associative processor 100 after this step, with bits b$_i$ and b$_v$ loaded into rows 116$i$ and 116$v$ at column 118$i$, with column 118$ii$ activated and with the input words shifted upwards by one tag register cell 122 in tags register 120$i$. A write operation cycle is performed as before to copy bit b$_{ii}$ to CAM cell 112 at column coordinate 118$ii$ and row coordinate 116$i$ and to copy bit b$_i$ to CAM cell 112 at column coordinate 118$ii$ and row coordinate 116$v$.

Figure 7C:
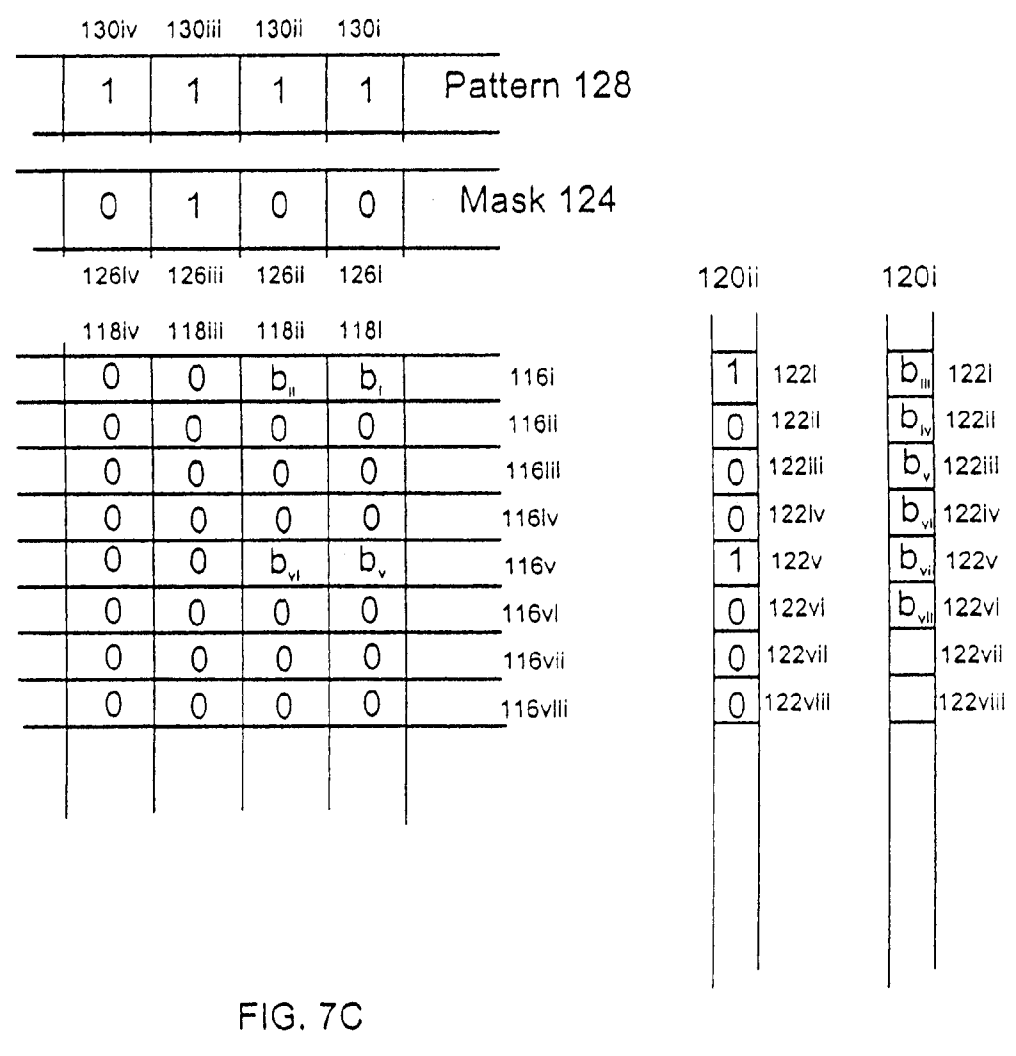

Next, column 118$iii$ is activated and the input words in tags register 120$i$ again are shifted upwards together by one tag register cell 122. FIG. 7C shows the state of associative processor 100 after this step, with bits b$_i$, b$_{ii}$, b$_v$ and b$_{vi}$ loaded into rows 116$i$ and 116$v$ at columns 118$i$ and 118$ii$, with column 118$iii$ activated and with the input words shifted upwards by one more tag register cell 122 in tags register 120$i$. A write operation cycle is performed as before to copy bit b$_{iii}$ to CAM cell 112 at column coordinate 118$iii$ and row coordinate 116$i$ and to copy bit b$_{vii}$ to CAM cell 112 at column coordinate 118$iii$ and row coordinate 116$v$.

Figure 7D:
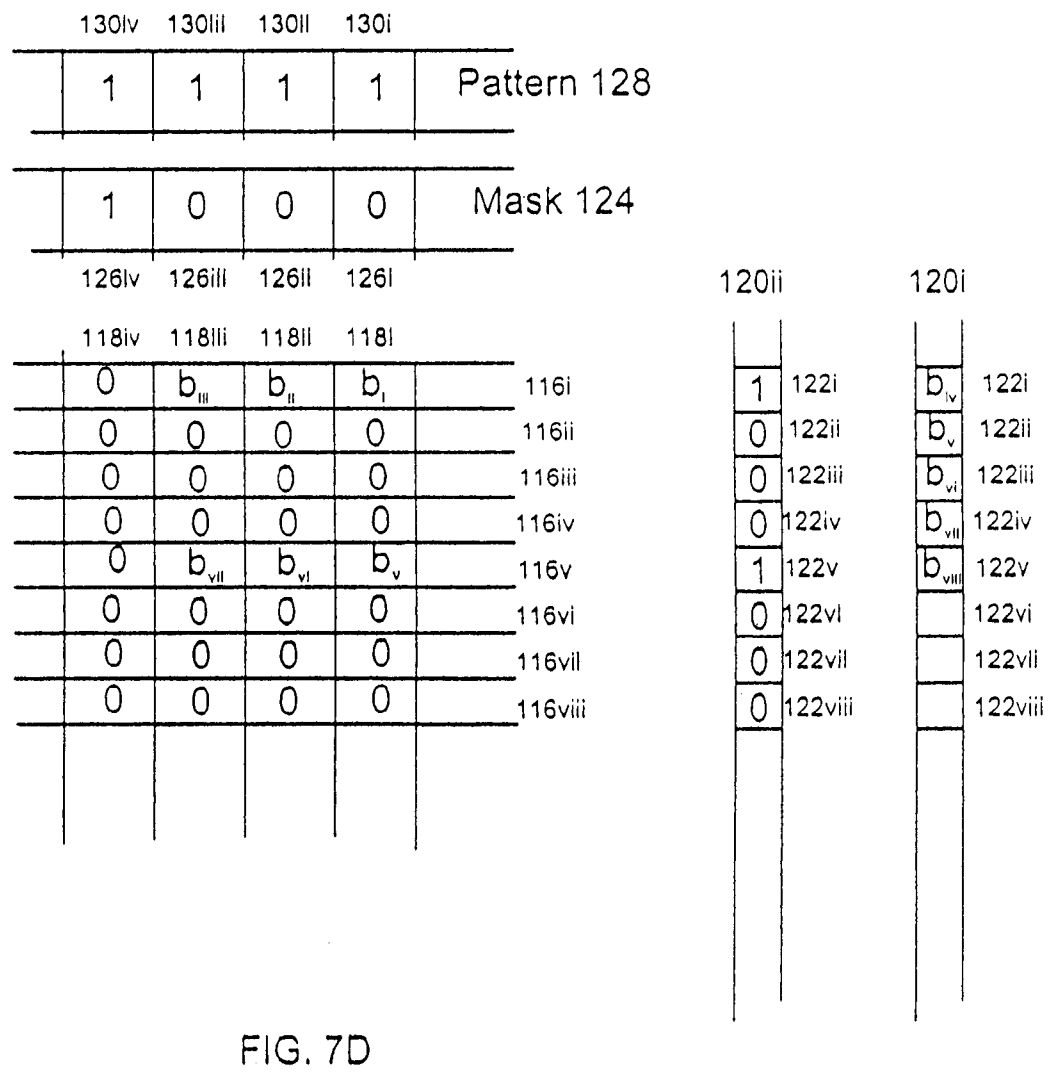

Next, column 118$iv$ is activated and the input words in tags register 120$i$ again are shifted upwards together by one tag register cell 122. FIG. 7D shows the state of associative processor 100 after this step, with bits b$_i$, b$_{ii}$, b$_{iii}$, b$_v$, b$_{vi}$ and b$_{vii}$ loaded into rows 116$i$ and 116$v$ at columns 118$i$, 118$ii$ and 118$iii$, with column 118$iv$ activated and with the input words shifted upwards by one more tag register cell 122 in tags register 120$i$. Finally, a write operation cycle is performed as before to copy bit b$_{iv}$ to CAM cell 112 at column coordinate 118$iv$ and row coordinate 116$i$ and to copy bit b$_{viii}$ to CAM cell 112 at column coordinate 118$iv$ and row coordinate 116$v$.

Subsequent to another input operation that moves another 8192 bits from DRAM 210 to I/O tags register 120$i$, rows 116$ii$ and 116$vi$ are selected for input by loading "1" bits into tag register cells 122$ii$ and 122$vi$ of tags register 120$ii$ and "0" bits into tag register cells 122$i$, 122$iii$–122$v$, 122$vii$ and 122$viii$ of tags register 120$ii$. This is done most conveniently simply by shifting the contents of tags register 120$ii$ collectively downwards by one tag register cell 122. The words now in I/O tags register 120$i$ are written to rows 116$ii$ and 116$vi$ of columns 118$i$ through 118$iv$. Another input operation moves another 8192 bits from DRAM 210 to I/O tags register 120$i$, rows 116$iii$ and 116$vii$ are selected for input by loading "1" bits into tag register cells 122$iii$ and 122$vii$ of tags register 120$ii$ and "0" bits into tag register cells 122$i$, 122$ii$, 122$iv$–122$vi$ and 122$viii$ of tags register 120$ii$, and the words now in I/O tags register 120$i$ are written to rows 16$iii$ and 116$vii$ of columns 118$i$ through 118$iv$. Following a fourth input operation, the transfer of a total of 8192 four-bit words to rows 116 of columns 118$i$ through 118$iv$ is completed by loading "1" bits into tag register cells 122$iv$ and 122$viii$ of tags register 120$ii$ and "0" bits into tag register cells 120$i$–120$iii$ and 120$v$–120$vii$ of tags register 120$ii$ and writing the words now in I/O tags register 120$i$ to rows 116$iv$ and 116$viii$ of columns 118$i$ through 118$iv$.

In this manner, m contiguous rows of a VGA image, stored in DRAM 210 as one m-bit word per pixel, are moved to one of arrays 112, one word per row 116, at the cost of only m row precharges. In the above example, m=4; but, as already noted, it is most common for m to be 8 or more. Note that consecutive words from the same image row are stored in the target array 112 spaced m rows 116 apart.

Figure 8B:
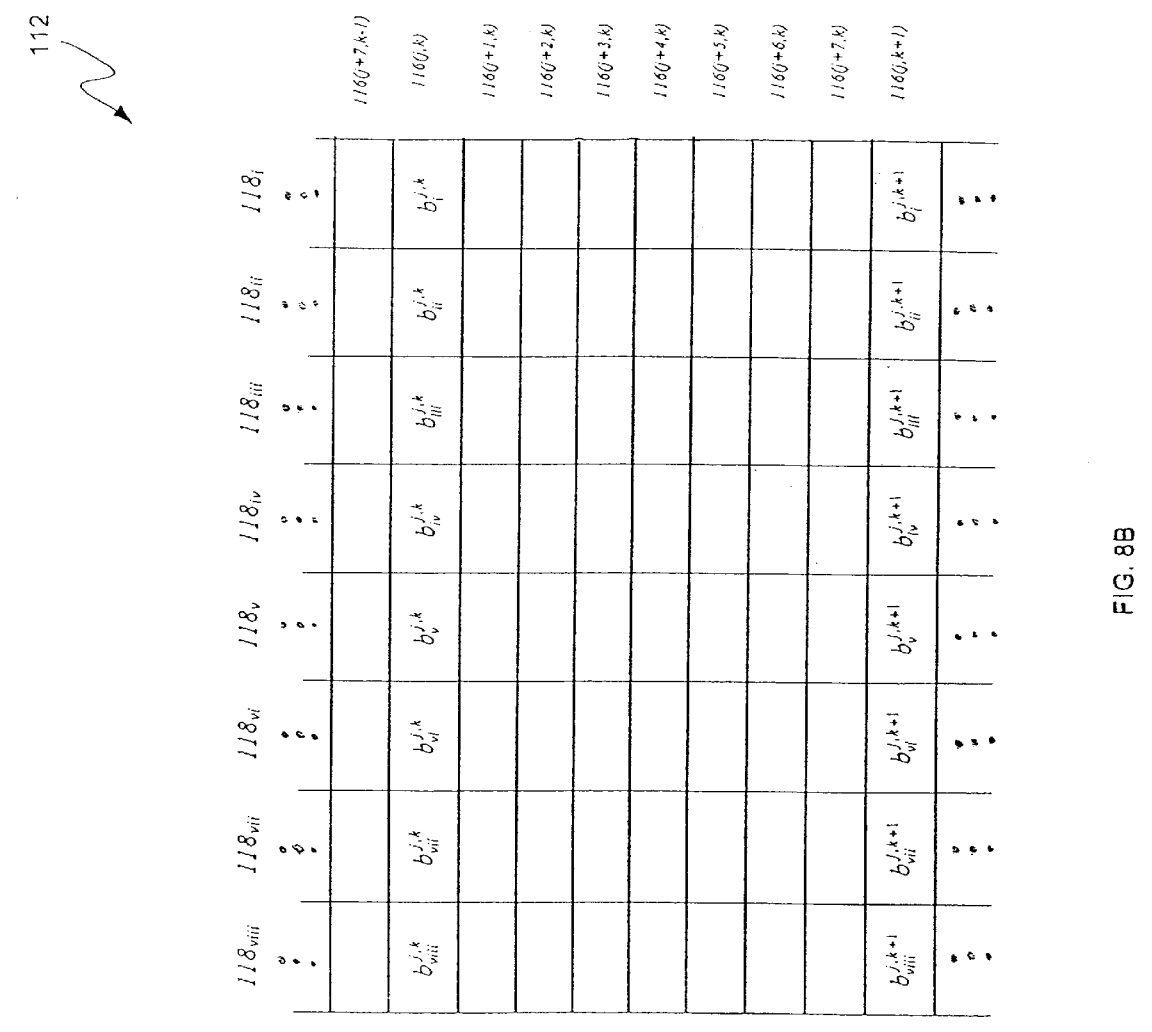
Figure 8C:
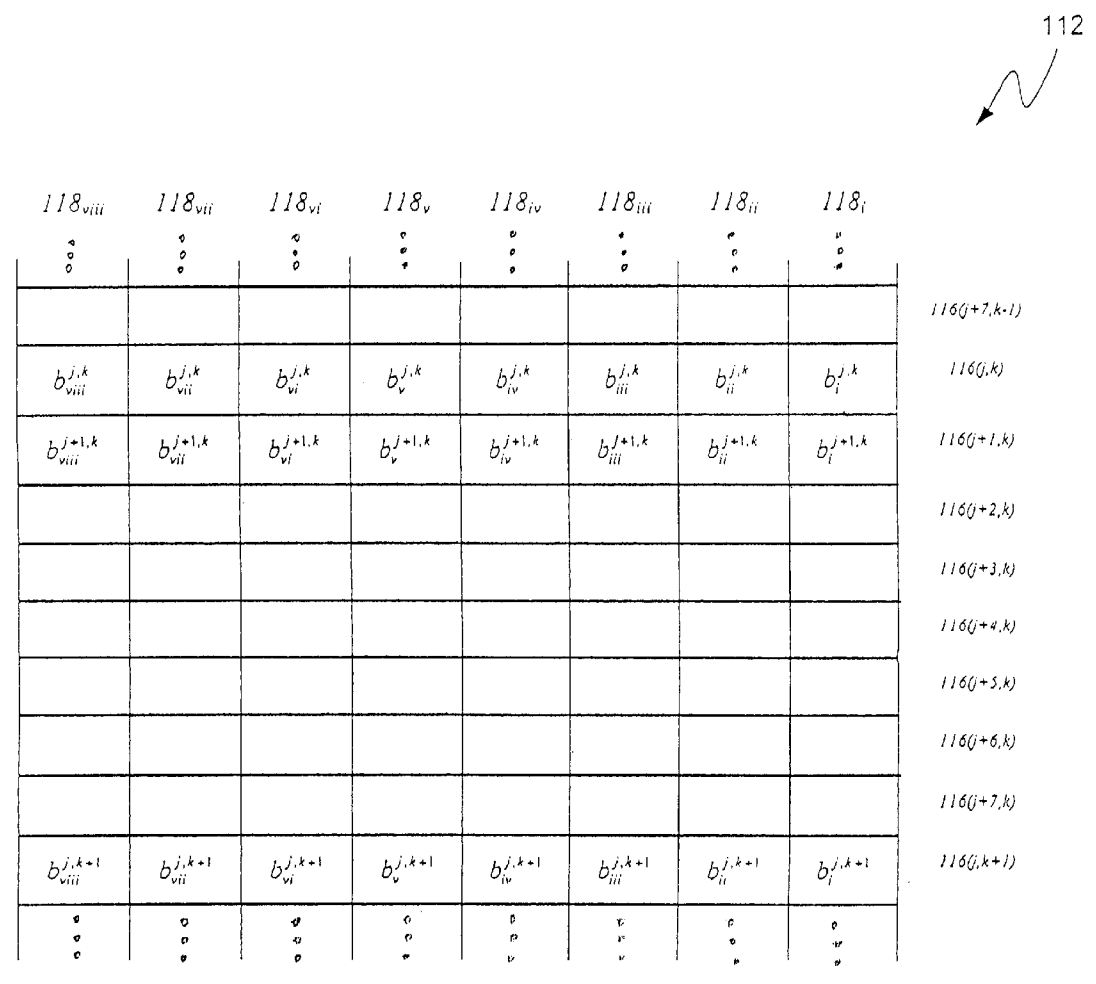
Figure 8D:
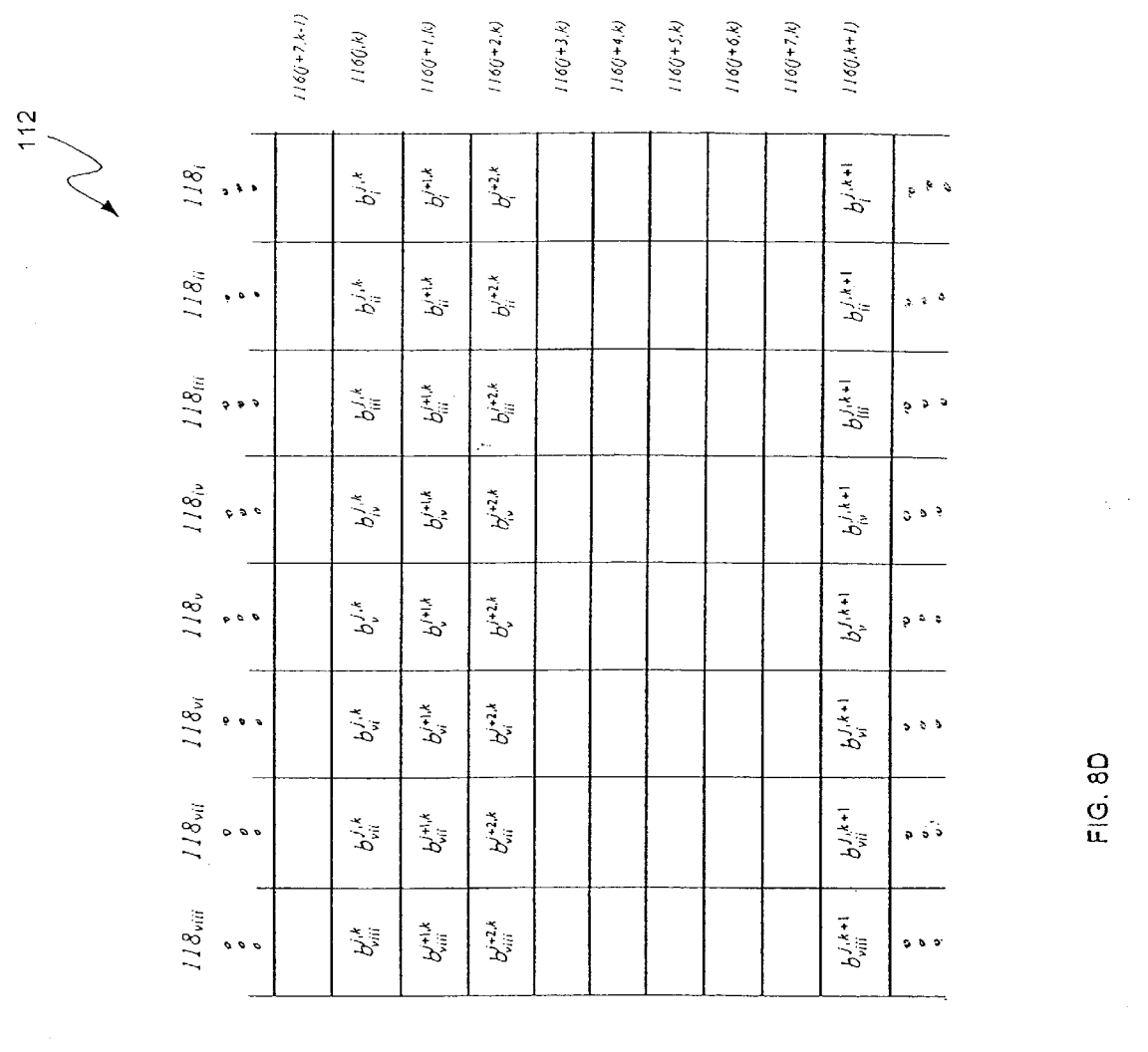
Figure 8E:
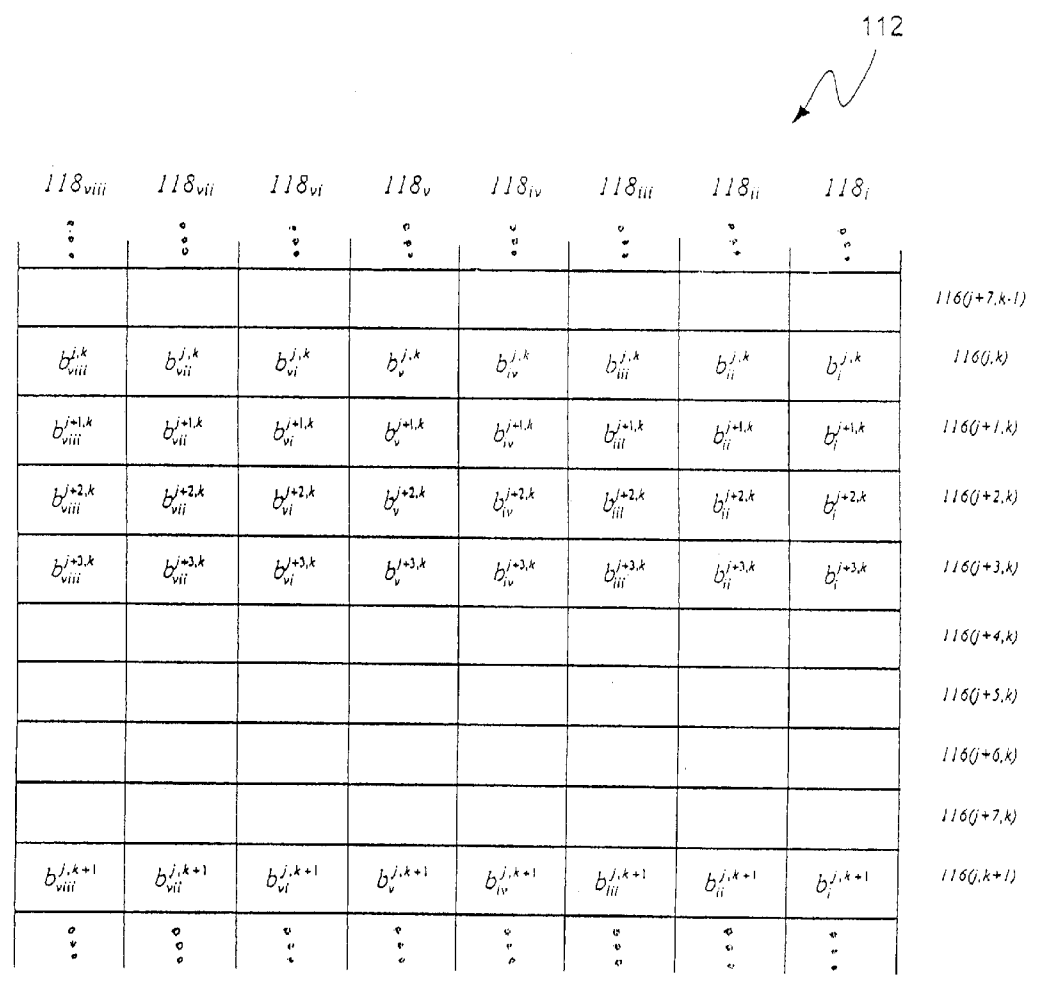
Figure 8F:
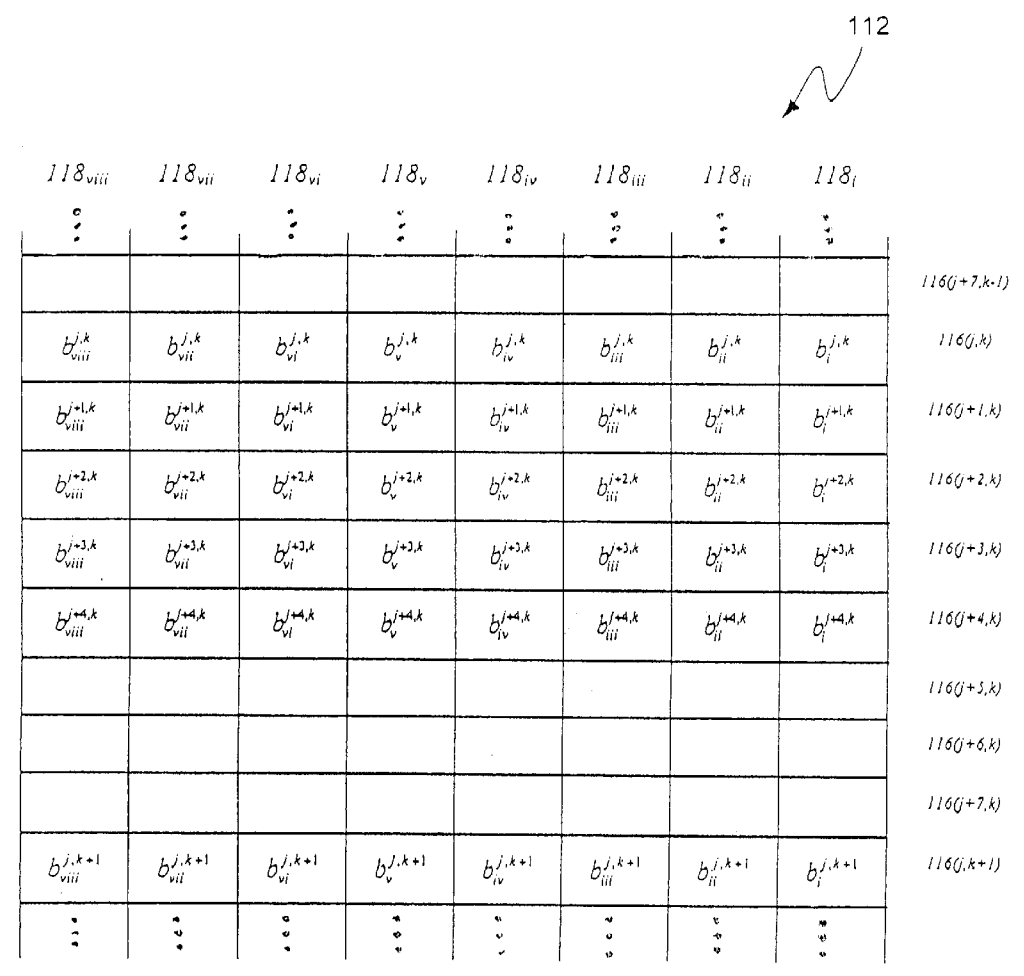
Figure 8G:
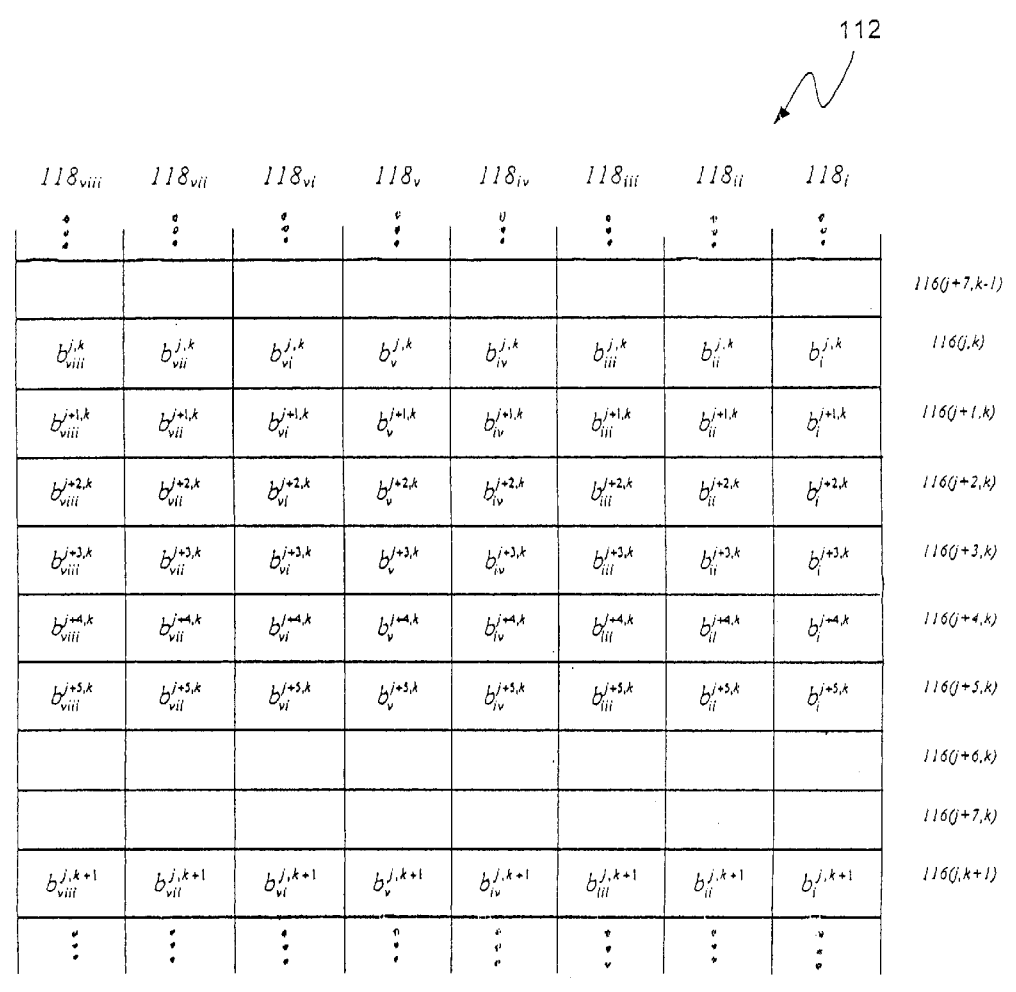

FIG. 8A shows a portion (three columns k−1, k and k+1) of eight rows j trough j+7 of DRAM 210 in which pixels of eight rows of a VGA image are stored as 8-bit words w in rows j−1 through j+8 and in columns k−1 through k+1. The subscript of each word w is that word's row index and column index. These words are moved to an array 112, one row at a time, as described above. FIG. 8B shows a portion of array 112 after words w from row j of DRAM 210 have been moved to corresponding rows 116 of columns 118$i$ through 118$viii$ of array 112, as bits b. The subscripts of bits b indicate their positions in their respective words w. The superscripts of words b indicate the rows and columns in DRAM 210 of their respective words w. FIG. 8C shows the same portion of array 112 after words w from row j+1 of DRAM 210 have been moved to corresponding rows 116 of array 112. FIG. 8D shows the same portion of array 112 after words w from row j+2 of DRAM 210 have been moved to corresponding rows 116 of array 112. FIG. 8E shows the same portion of array 112 after words w from row j+3 of DRAM 210 have been moved to corresponding rows 116 of array 112. FIG. 8F shows the same portion of array 112 after words w from row j+4 of DRAM 210 have been moved to corresponding rows 116 of array 112. FIG. 8G shows the same portion of array 112 after words w from row j+5 of DRAM 210 have been moved to corresponding rows 116 of array 112. FIG. 8H shows the same portion of array 112 after words w from row j+6 of DRAM 210 have been moved to corresponding rows 116 of array 112.

Finally, FIG. 8I shows the same portion of array 112 after words w from row j+7 of DRAM 210 have been moved to corresponding rows 116 of array 112. Note, in FIG. 8I, that vertically adjacent pixels of the VGA image are moved to vertically adjacent locations in array 112, and that horizontally adjacent pixels of the VGA image are eight rows 116 apart. That bits of equal significance in these pixels all occupy the same column 118 facilitates the parallel execution of associative compare and write operations on these data. A straightforward modification of this data input method moves pairs of pixels to each row 116 of sixteen columns 118 of array 112, with pixel pairs from the same row of the VGA image being sixteen rows 116 apart in array 112.

The arrangement of bits b in array 112, as illustrated in FIG. 8I, facilitates the implementation of operations, such as smoothing by short filters and short convolutions, that require neighboring pixels as input. For more on such "neighborhood" operations, see U.S. Pat. No. 5,974,521. Communication among rows 116 is achieved by shifting the results of compare operations via tags registers 120, as described above. For example, shifting the output of a compare operation upward by one cell 122 of a tags register 120 communicates this output from each pixel (other than the pixels of row j+7) to the pixel immediately above. Similarly, shifting the output of a compare operation downward by eight cells 122 of a tags register 120 communicates this output from each pixel to the pixel immediately to its right. The short length of these shifts makes these neighborhood operations very efficient. Most preferably, tags register 120 is configured to execute shifts of length 1, 2, 8 and 16 bits within a single machine cycle.

Figure 9:
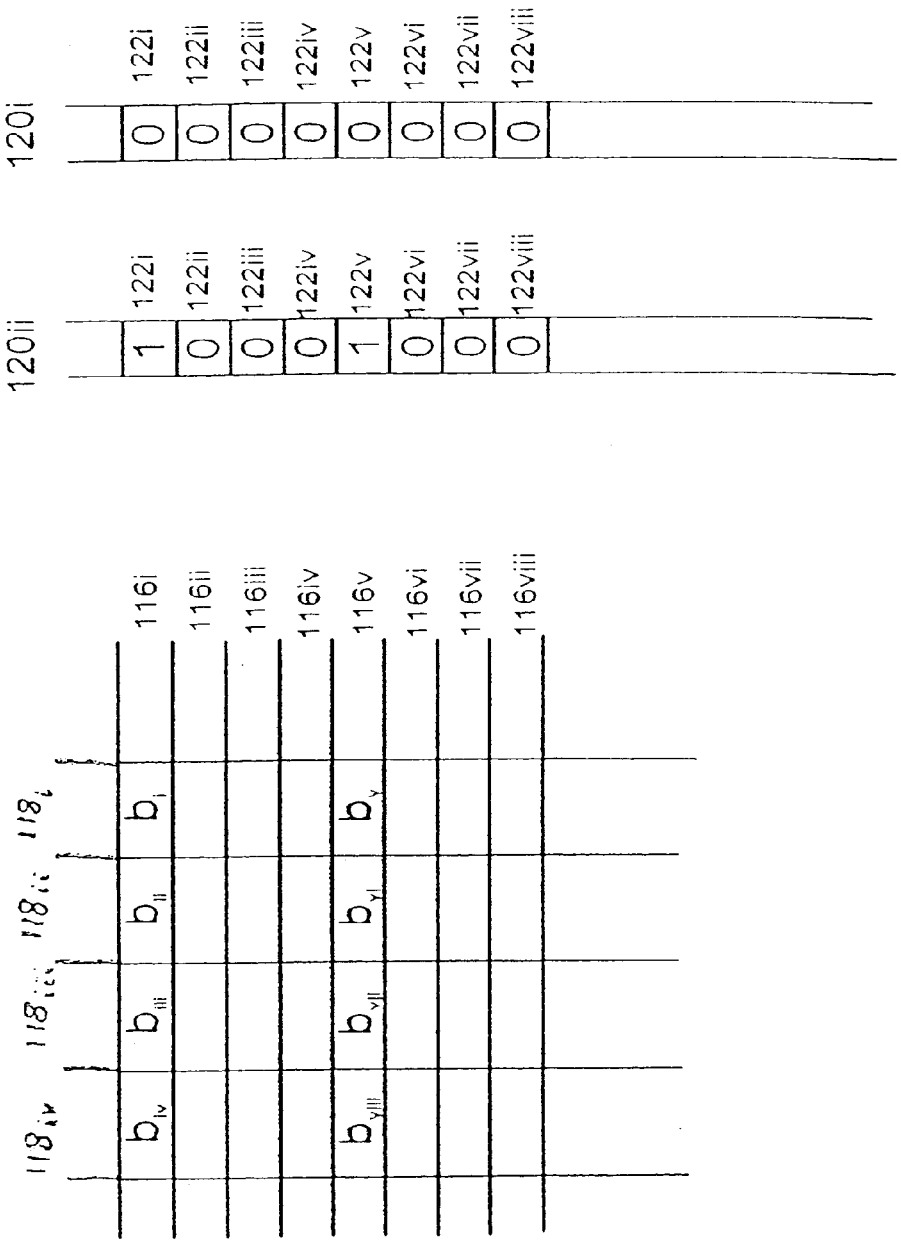
FIG. 9 illustrates the initialization of parallel output of data words from CAM cell rows of the associative processor of FIG. 2 to the I/O tags register of the device of FIG. 3

Output of words from selected rows 116 is performed analogously. FIG. 9 shows two four-bit words, binary b$_{iv}$b$_{iii}$b$_{ii}$b$_i$ and binary b$_{viii}$b$_{vii}$b$_{vi}$b$_v$, in rows 116$i$ and 116$v$, respectively, of columns 118$i$ through 118$iv$, that are to be transferred to I/O tags register 120, labeled "120$i$" in FIG. 9, with the help of mask bits in a second tags register 120, labeled "120$ii$" in FIG. 9 to activate rows 116$i$ and 116$v$. Tags register 120$i$ is initialized to all "0" bits, as shown, and the appropriate cells 130 of pattern register 128 are initialized to "1" bits. First, column 118*iv* is activated using mask register 128 and a compare operation cycle is used to copy bits $b_{iv}$ and $b_{viii}$ to I/O tags register 120*i*. Next, the contents of I/O tags register 120*i* are shifted down collectively by one tag register cell 122, column 118*iii* is activated using mask register 128 and a compare operation cycle is used to copy bits $b_{iii}$ and $b_{vii}$ to I/O tags register 120*i*. Then, the contents of I/O tags register 120*i* are shifted down collectively by one tag register cell 122, column 118*ii* is activated using mask register 128 and a compare operation cycle is used to copy bits $b_{ii}$ and $b_{vi}$ to I/O tags register 120*i*. Finally, the contents of I/O tags register 120*i* are shifted down collectively once more by one tag register cell 122, column 118*i* is activated using mask register 128 and a compare operation cycle is used to copy bits $b_i$ and $b_v$ to I/O tags register 120*i*.

This rotation of VGA image input from tags register 120*i* to rows 116 and of processed VGA image output from rows 116 to tags register 120*i*, as illustrated in FIGS. 7–9, is needed only for the input of unprocessed VGA image data and the output of the final processed VGA image data. If it is necessary to store intermediate results temporarily in DRAM 210, as described above, columns 116 of intermediate results are copied as such into rows of DRAM 210, without rotation, even though each word of DRAM 210 that is used to store the intermediate results typically then includes a mixture of bits from different image words and so is meaningless outside the immediate processing context. Similarly, when the intermediate results are retrieved from DRAM 210, they are copied as such from the relevant rows of DRAM 210 to the relevant columns 116, without rotation.

Figure 10:
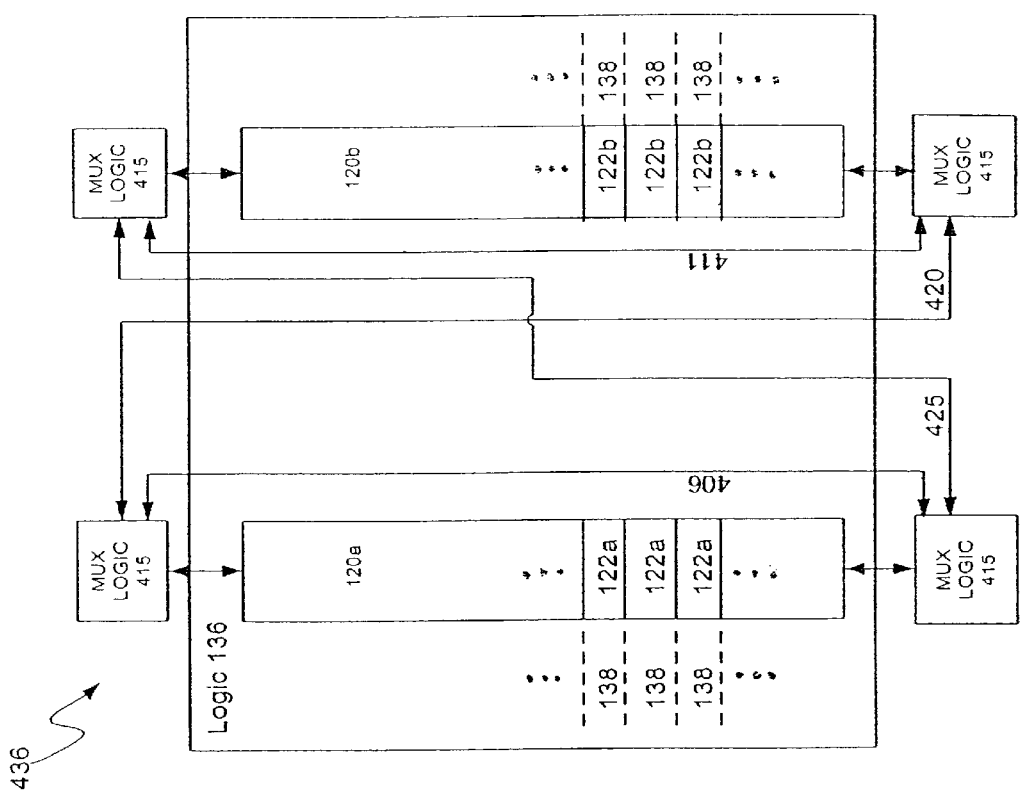
FIG. 10 shows an enhanced embodiment of the tags logic block of FIG. 2 that allows two tags registers to be combined into a single long tags register.

FIG. 10 is a schematic illustration of an enhanced embodiment 436 of tags logic block 136. To tags logic block 136 of FIG. 2 are added four multiplexing logic blocks 115 and associated lines 406, 411, 420 and 425. Embodiment 436 alternates between two configurations, a first configuration in which a shift of the contents of tags register 120*a* moves those contents into tags register 120*b*, and/or vice versa, and a second configuration in which the contents of tags registers 120*a* and 120*b* are shifted only within their respective tags registers. Multiplexing logic blocks 415 control the flow of data into and out of tags registers 120*a* and 120*b*. To direct data shifted out of tags register 120*a* (or 120*b*) into tags register 120*b* (or 120*a*), multiplexing logic blocks 415 direct signals over lines 420 and 425. To shift internally within tags registers 120*a* and 120*b*, multiplexing logic blocks 415 direct signals over lines 406 and 411.

A device 200 that includes embodiment 436 of tags logic block 136 thus is enabled to optionally combine tags registers 120*a* and 120*b* into a single long tags register. Under some circumstances, this enables the effective doubling of the amount of data that is processed by arrays 112*a* and 112*b*. For example, suppose that the first eight rows of eight-bit pixels of a VGA image are loaded into array 112*a* and that the second eight rows of the eight-bit pixels of the VGA image are loaded into array 112*b*, as described above. Tags registers 120*a* and 120*b* are combined temporarily into a single long tags register, and the output of compare operations are shifted from the top (or bottom) of tags register 120*a* to the bottom (or top) of tags register 120*b* (or vice versa). This enables the implementation of a neighborhood operation that spans both the top row(s) of the first eight rows of the VGA image that are loaded into array 112*a* and the bottom row(s) of the second eight rows of VGA image that are loaded into array 112*b*. In subsequent neighborhood operations, tags registers 120*a* and 120*b* may be uncoupled, so that the first eight rows of the VGA image, in array 112*a*, and the second eight rows of the VGA image, in array 112*b*, are processed independently.

Device 200 has the advantage over device 300 of the relative simplicity of array 202 of tri-state buffers 212, compared with array 302 of bi-directional buffers 312, and of the ability to exchange data words between DRAM 210 and rows 116 in parallel. Device 300 has the advantage over device 200 of lower net power consumption, because, with tags logic block 136 in its preferred location between CAM cell arrays 112, as illustrated in FIG. 2, device 200 requires at least some data exchange lines, of bus 206 or of array 202, to span array 114*b* in order to reach tags logic block 136; and with tags logic block 136 to the right of both CAM cell arrays 112, as illustrated in FIG. 3, word enable lines 132*a* and match result lines 134*a* must span both arrays 114.

While the invention has been described with respect to a limited number of embodiments, it will be appreciated that many variations, modifications and other applications of the invention may be made.

What is claimed is:

1. A device for processing data, comprising:
   (a) a memory for storing the data;
   (b) an associative processor, for processing the data, said associative processor including:
       (i) a plurality of arrays of content addressable memory (CAM) cells, each said array including a like plurality of rows of said CAM cells,
       (ii) at least one tags register, including a plurality of tag register cells equal in number to said rows of said each array; and
       (iii) a mechanism for reversibly associating each said at least one tags register operationally with at least one of said arrays, each said tags register cell of said each tags register being associated with a respective row of each said at least one array; and
   (c) a bus for exchanging the data between said memory and one of said at least one tags register.

* * * * *